United States Patent [19]

Naito et al.

[11] 4,334,029

[45] Jun. 8, 1982

[54] UNFIRED REFRACTORY COMPOSITION

[75] Inventors: Hiroyuki Naito; Takashi Maruya, both of Tsuruoka; Kyugo Gotoh, Urawa; Hideyo Ohmori, Funabashi, all of Japan

[73] Assignees: Mizusawa Kazahu Kogyo Kabushiki Kaisha, Osaka; Mitsubisha Corporation, Tokyo; Yamato Refractives & Co., Chiba, all of Japan

[21] Appl. No.: 222,929

[22] Filed: Jan. 6, 1980

[30] Foreign Application Priority Data

Jan. 9, 1980 [JP] Japan .................................. 55-579

[51] Int. Cl.$^3$ .............................................. C04B 35/52
[52] U.S. Cl. ...................................... 501/109; 106/84
[58] Field of Search ............................. 106/56, 84, 85

[56] References Cited

U.S. PATENT DOCUMENTS 4,102,694 7/1978 Sasaki et al. ........................ 106/56
4,171,984 10/1979 Hosaka et al. ..................... 106/84

Primary Examiner—James Poer
Attorney, Agent, or Firm—Sherman & Shalloway

[57] ABSTRACT

Disclosed is an unfired refractory composition comprising a refractory aggregate and a binder for the refractory aggregate, in which the binder comprises a water-soluble or water-dispersible siliceous binder in an amount of 1 to 20% by weight based on the refractory aggregate, a carbonizable organic binder in an amount of 2 to 15% by weight based on the refractory aggregate and a phosphate type hardening agent in an amount of 0.5 to 20% by weight based on the refractory aggregate.

This refractory composition is moldable and hardenable at normal temperatures, and has an excellent mechanical strength not only at relatively low temperatures below about 500° C. and high aggregate-firing temperatures but also intermediate temperatures between these low and high temperatures. Accordingly, if this refractory composition is used as a liner for a furnace or the like, break-down of the liner in the intermediate region between the inner surface side and the outer surface side is effectively prevented, resulting in prominent elongation of the life of the liner. Furthermore, this refractory composition has a long pot life in the kneaded state and is excellent in the working property and processability.

7 Claims, No Drawings

UNFIRED REFRACTORY COMPOSITION

BACKGROUND OF THE INVENTION (1) Field of the Invention

The present invention relates to an unfired refractory composition. More particularly, the present invention relates to an unfired refractory composition which is moldable and hardenable at normal temperatures and which has an excellent mechanical strength over a broad temperature history range when it is used as a refractory in the unfired state.

(2) Description of the Prior Art

Fired refractory bricks have heretofore been prepared according to the method comprising pulverizing a refractory aggregate, adjusting the particle size if necessary, kneading the pulverized aggregate with an appropriate binder, molding the kneaded mixture into a desired shape, drying the molded mixture and firing the dried molded mixture to effect sufficient biscuiting. In order to obtain refractory bricks having a sufficiently high mechanical strength according to this method, it is necessary to carry out firing at such a high temperature as 1200° to 1900° C. for such a long time as 8 to 144 hours. Accordingly, this method is disadvantageous in that a large quantity of thermal energy is necessary for the firing operation.

Refractory bricks prepared by the process in which the firing step is omitted in the above-mentioned method so as to save thermal energy have already been known as unfired refractory bricks. More specifically, a binder capable of providing a sufficient strength at the molding step is incorporated in a refractory and the mixture is molded under high compression, and final firing of the so formed unfired refractory brick is effected by heat applied when the brick is actually used. As another unfired refractory, there is known an amorphous refractory. This amorphous refractory is a kneaded composition comprising an aggregate and a binder, which is used for repairing, protection or coating of a furnace, a laddle, a runner or other accessory member, and also in case of this refractory, final firing of the refractory is effected by heat applied when it is actually used in the furnace or the like.

However, when such unfired refractory is actually used for a liner of a furnace or accessory equipment, a problem described below arises.

The inner surface of this refractory liner which falls in contact with a molten metal or flame is heated at a temperature sufficient to sinter the aggregate, but the outer surface of the refractory lining is heated at a temperature of about 500° C. at highest. In short, a large temperature gradient is formed in the thickness direction in the refractory liner. Ordinarily, a kneaded molded product comprising an aggregate and a binder has a certain mechanical strength at a relatively low temperature below 500° C. by the action of the binder and at a high temperature exceeding 1200° C., the product has a relatively high mechanical strength by sintering of the aggregate. However, in the intermediate temperature region between the above lower and higher temperatures, the strength is very poor. Accordingly, the above-mentioned refractory brick is readily broken in the region intermediate between the inner surface side and the outer surface side. This is a fatal defect of the known unfired refractory.

For example, sodium silicate which is most popularly used as the binder for the infinitive shape refractory has an appropriate sticking force and is advantageous in that it is excellent in the kneadability and moldability. However, an unfired refractory comprising sodium silicate as the binder is defective in that when it is heated at a temperature higher than 500° C. but lower than the aggregate-sintering temperature, the mechanical strength is less than ⅓ of the mechanical strength of the unheated refractory and is less than 1/5 of the sintered refractory. Moreover, this unfired refractory comprising sodium silicate as the binder is difficult to harden at room temperature, and in order to harden this refractory, it is necessary to heat the refractory at a temperature higher than 250° C. This heat treatment is troublesome. Fuerthermore, if this heat treatment is not conducted, the refractory comes to have a moisture-absorbing property and the strength of the unfired refractory is gradually degraded as it absorbs moisture. This is another fatal defect of the unfired refractory of this type.

Organic binders such as pitch, tar, atactic polypropylene, starch, phenolic resin and carboxymethyl cellulose have appropriate viscousness and adhesiveness. An unfired refractory comprising such organic binder has a satisfactory mechanical strength at low temperatures, but when it is heated at a temperature exceeding 500° C., the carbonized binder is gradually oxidized and extreme reduction of the strength is caused as in case of the siliceous binder. Furthermore, when the unfired refractory comprising the organic binder is heated at the aggregate-sintering temperature, on carbonization of the organic binder, expansion or bubbling is caused to some extent. Therefore, it is very difficult to obtain sintered refractory having a fine and compact structure. This is another defect of the organic binder.

A phosphate type binder such as aluminum phosphate has a reactivity with most of refractory aggregates (which are essentially basic). If an aggregate is kneaded with such phosphate type binder, hardening takes place in a relatively short time, and even if the kneaded composition is not entirely hardened, a heterogeneous, partially hardened product or a premature hardening product is formed. Accordingly, an unfired refractory comprising a phosphate type binder is defective in that the working property is poor and the pot life is short. Furthermore, this unfired refractory is disadvantageous in that reduction of the mechanical strength in the above-mentioned intermediate temperature region is conspicuous.

SUMMARY OF THE INVENTION

We found that when a mixture containing a water-soluble or water-dispersible siliceous binder, a carbonizable organic binder and a phosphate type hardening agent at a specific ratio is used as a binder for binding a refractory aggregate, there is obtained an unfired refractory which is moldable and hardenable at normal temperatures and which has a very high mechanical strength not only in the low temperature region and the aggregate-sintering temperature region but also in the intermediate temperature region between said two temperature regions (hereinafter referred to simply as "intermediate temperature region"). We have now completed the present invention based on this finding.

It is therefore a primary object of the present invention to provide an unfired refractory composition in which the above-mentioned defects of the conventional unfired refractory materials are effectively eliminated.

Another object of the present invention is to provide an unfired refractory which is moldable and hardenable at normal temperatures and which has an excellent mechanical strength not only in the low temperature region and the aggregate-sintering temperature region but also in the intermediate temperature region.

Still another object of the present invention is to provide an unfired refractory composition in which, when the composition is used as a refractory liner for a furnace or accessory equipment thereof, break-down of the refractory in the intermediate region between the outer surface side and the inner surface side is effectively prevented and therefore, the life of the refractory liner can remarkably be prolonged.

A further object of the present invention is to provide an unfired refractory composition of the normal temperature hardening type which has a remarkably prolonged pot life in the kneaded state and is excellent in the working property and processability.

In accordance with the present invention, there is provided an unfired refractory composition comprising a refractory composition comprising a refractory aggregate and a binder for binding said aggregate, said binder comprising a water-soluble or water-dispersible siliceous binder in an amount of 1 to 20% by weight, especially 3 to 10% by weight, based on the refractory aggregate, a carbonizable organic binder in an amount of 2 to 15% by weight, especially 4 to 8% by weight, based on the refractory aggregate, and a phosphate type hardening agent in an amount of 0.5 to 20% by weight, especially 1.5 to 10% by weight, based on the refractory aggregate.

The present invention will now be described in detail.

DETAILED DESCRIPTION OF THE PREFERRED EMBODIMENTS

In the present invention, a siliceous binder, a carbonizable organic binder and a phosphate type hardening agent are used in combination as the binder. If these three components are used in combination, a synergistic effect of increasing the mechanical strength in the intermediate temperature region of the formed unfired refractory, which is not attained by any of the conventional binders, can unexpectedly be attained. As pointed out hereinbefore, if one of the three components is used singly as the binder, drastic reduction of the mechanical strength is caused in the intermediate temperature region. Furthermore, if any one of the three components of the binder is not incorporated, the mechanical strength in the intermediate temperature region can hardly be increased to a satisfactory level. For example, the combination of a siliceous binder and a phosphate type hardening agent provides a moisture-resistant refractory shaped article as disclosed in Japanese Patent Publication No. 24206/78, but as is seen from the composition of this binder, the binder tends to flow while forming a low-melting-point glass, and therefore, melting loss is caused in the intermediate temperature region and it is difficult to maintain the mechanical strength at a predetermined level in the intermediate temperature region. The combination of an organic binder and a phosphate type hardening agent provides a binder medium excellent in the resistance to melting flow and the resistance to thermal deformation, as compared with a binder medium comprised solely of an organic binder, as disclosed in Japanese Patent Publication No. 7310/79. However, also in a refractory prepared by using this combination, considerable reduction of the mechanical strength is caused in the intermediate temperature region. More specifically, when a phosphate type hardening agent is used in combination with an organic binder, it will provide a bonded structure having a relatively high heat resistance by condensation and carbonization of the organic binder, but in this case, it is considered that the formed carbonaceous medium is oxidized in a relatively short time, which results in reduction of the mechanical strength in the intermediate region.

In contrast, when the above-mentioned three components are used in combination according to the present invention, formation of a glass layer showing a fluidity at a relatively low temperature is inhibited and the loss by oxidation of the carbonizable organic binder is controlled at a low level. It is believed that for the above reason, the mechanical strength in the intermediate temperature region is elevated to a high level according to the present invention. This presumption is supported by the experimental fact that even if a refractory formed from the composition of the present invention is actually heated at a temperature included in the above-mentioned intermediate temperature range for a long time, formation of a porous structure observed in case of other binders is effectively left without substantial loss.

Siliceous Binder

In the present invention, any of known siliceous binders having a water-solubility can be used as the water-soluble siliceous binder. An aqueous solution of an alkali metal silicate called "water glass" is most easily commercially available. The siliceous binder is prepared by melting a starting silicic acid component and a starting alkali metal component, forming a cullet (molten and pulverized product) of an alkali metal silicate from the melt, extracting the cullet with water in an autoclave and concentrating the aqueous extract of the alkali metal silicate. In the alkali metal silicate prepared by this method, the molar ratio of the alkali metal component ($Na_2O$) to the silicic acid component ($SiO_2$) is ordinarily in the range of from about 1 to about 3. Each product is a transparent liquid resembling malt syrup.

In the present invention, since the siliceous binder is combined with the phosphate type hardening agent or a refractory aggregate having a hardening action to the siliceous binder is sometimes used, it is preferred that a siliceous binder which does not undergo partial gelation or premature gelation on contact with such hardening agent or aggregate be used. If partial gelation or premature gelation is caused, the texture of the resulting solidified and bonded shaped article becomes heterogeneous, and reduction of the mechanical strength or water resistance of the shaped article is readily caused.

As one example of water-soluble siliceous binders preferred from the above viewpoint, there can be mentioned a polyfunctional alkali metal silicate having a dehydration gel proportion (F.G., %), defined by the following formula, of at least 50%:

$$F.G. = [(C_0 - C)/C_0] \times 100$$

wherein $C_0$ stands for the weight (g) on the dry basis of a precipitate recovered when 100 g of an alkali metal silicate having an $SiO_2$ concentration of 25 to 30% is dispersed in 150 ml of kerosine in a mixer, 50 ml of methanol is added as a dehydrating agent to the dispersion under high speed agitation at a rotation rate higher than 1000 rpm and the formed precipitate is separated by filtration, and C stands for the weight (g) on the dry basis of a fraction passing through a 3-mesh sieve when the recovered precipitate is classified by the 3-mesh sieve.

This polyfunctional alkali metal silicate is obtained by reacting solid active silicic acid with a hydroxide, carbonate or bicarbonate of an alkali metal in the presence of water. Properties and preparation processes of alkali metal silicates of this type are described in detail in Japanese Patent Application Laid-Open Specification No. 126698/77 proposed by us.

A most preferred siliceous binder is an alkali metal borosilicate solution in which the $M_2O/SiO_2$ molar ratio (in which M stands for an alkali metal) is in the range of from 0.85 to 1.20 and the $B_2O_3/SiO_2$ molar ratio is in the range of from 0.01 to 0.3. This alkali metal borosilicate solution is prepared by mixing an alkali metal silicate solution in which the $M_2O/SiO_2$ molar ratio (in which M stands for an alkali metal) is in the range of from 0.1 to 1 with an alkali metal borate solution in which the $B_2O_3/M_2O$ molar ratio is in the range of from 0.1 to 2 in the presence of water.

From the viewpoints of the pot life and properties required for the binder, it is preferred in this alkali metal borosilicate solution that the $M_2O/SiO_2$ molar ratio be in the range of from 0.4 to 1.2, especially from 0.5 to 1.1. More specifically, if the $M_2O/SiO_2$ molar ratio is lower than 0.4, it becomes difficult to prolong the pot life to an order of a day, and when a phosphate type hardening agent or the like is incorporated, partial gelation or premature gelation is caused or reduction of the water resistance or the water-resistant strength is often observed in the unfired refractory product. If the $M_2O/SiO_2$ molar ratio exceeds 1.2, the binding power of the alkali metal borosilicate solution is reduced and various mechanical strength characteristics of the final product are reduced to unsatisfactory levels. Furthermore, a binder having a higher $M_2O$ content is disadvantageous from the economical viewpoint, because a large amount of the phosphate type hardening agent should be used.

In this alkali metal borosilicate solution, from the viewpoints of the pot life of the composition, liquid stability and binding power, it is preferred that the $B_2O_3/SiO_2$ molar ratio be in the range of from 0.01 to 0.3, especially from 0.02 to 0.25. If the $B_2O_3/SiO_2$ molar ratio is lower than 0.01, it is difficult to prolong the pot life of the composition to an order of a day. If the $B_2O_3/SiO_2$ molar ratio exceeds 0.3, the stability of the liquid is reduced or the binding force of the composition is lowered.

This alkali metal borosilicate has such a characteristic property that even if it is dehydrated with methanol, it retains a liquid state stably, and when this is used as the siliceous binder in the present invention, various advantages can be attained.

The concentration of the siliceous binder can be changed in a broad range, but from the viewpoint of the operation adaptability, it is preferred that the solid concentration of the siliceous binder, as $SiO_2$, be in the range of from 5 to 50% by weight, especially from 10 to 35% by weight.

Organic Binder

All of organic binders heretofore used for the manufacture of refractory materials of this type can be used as the organic binder in the present invention. For example, as the water-soluble polymer or water-dispersible polymer, there can be used natural pastes such as dextrin, starch, gum arabic, molasses, casein, glue and gelatin, and semi-synthetic and synthetic pastes such as methyl cellulose, carboxymethyl cellulose, carboxymethylated starch, polyvinyl alcohol, sodium alginate, sodium ligninsulfonate, sodium polyacrylate, polyacrylamide, vinyl ether/maleic acid copolymers, polyvinyl acetate emulsions, styrene-butadiene copolymer latices and acrylic resin emulsions. These organic binders exert an adhering force at the kneading step as well as the intended binding force.

Of course, any of materials that can show a binding action under application of heat and can finally be carbonized may be used as the organic binder in the present invention. Accordingly, thermosetting resins such as phenolic resins, epoxy resins, furan resins, xylene-formaldehyde resins, ketone-formaldehyde resins, amino resins (urea resins and melamine resins), alkyd resins, unsaturated polyester resins, cyanuric acid ester resins and polyurethane resins, and thermoplastic resins such as polypropylene, polyethylene, polystyrene, polyacrylonitrile, thermoplastic polyesters, polyamides and polyvinyl acetate may be used in the form of powders, granules, fibers or organic solvent solutions.

Furthermore, petroleum or coal fractions such as pitch, asphalt and anthracene oil, and mineral, vegetable and animal waxes may be used as the organic binder.

These organic binders may be used singly or in the form of mixtures of two or more of them.

Phosphate Type Hardening Agent

Various phosphates can be used as the phosphate type hardening agent in the present invention. For example, there can be used silicon polyphosphate, alkali metal salts of silicon polyphosphate, titanium phosphate, zirconium phosphate, aluminum phosphate, boron phosphate, calcium phosphate, magnesium phosphate, zinc phosphate, barium phosphate, lead phosphate and sodium phosphate. These phosphates may be used singly in the form of mixtures of two or more of them. In these phosphates, the phosphoric acid component may be present in the form of any of orthophosphoric acid, meta-phosphoric acid, pyrophosphoric acid, tripolyphosphoric acid or other condensed phosphoric acid. However, it is ordinarily preferred that the phosphoric acid component is in the highly condensed form. The phosphates may be either acidic phosphates or basic phosphates, and the ratio between the phosphoric acid component ($P_2O_5$) and the metal component ($M^1O_{n/2}$) can widely be changed within the range defined by the following formula:

$$M^1O_{m/2} \cdot nP_2O_5$$

wherein M stands for a metal inclusive of silicon, m stands for the valency of the metal $M^1$, and n is a number of from 0.1 to 0.7, especially from 0.2 to 0.5.

In order to harden the alkali metal silicate binder uniformly and tightly, it is preferred that the inorganic phosphate type hardening agent used should have such a property that the phosphoric acid component ($P_2O_5$) is gradually released. More specifically, it is preferred that the initial dissolution amount (B), defined by the following formula, of the inorganic phosphate type hardening agent be smaller than 250, particularly smaller than 200, especially particularly smaller than 100:

$$Y = AX + B$$

wherein X stands for the elapsing time (minutes) of up to 120 minutes from the point when 1 gram of the hardening agent is added to a 4 N aqueous solution of sodium hydroxide, and Y stands for the integrated dissolution amount (mg/100 ml) of phosphoric acid dissolved out in the above sample solution during the elapsing time, and that the average hydrolysis speed constant (A) in the above formula be at least 0.2, especially in the range of from 0.3 to 1.3. Properties and preparation processes of gradually-releasing phosphate hardening agents of this type are described in detail in the specification of U.S. Pat. No. 4,018,616.

These inorganic phosphate type hardening agents may be used singly or in combination with known hardening assistants. As the hardening assistant, there can be mentioned, for example, oxides and hydroxides of various metals such as calcium oxide, magnesium oxide, zinc oxide, aluminum oxide, magnesium hydroxide, calcium hydroxide and aluminum hydroxide, and silicofluorides of various metals such as aluminum silicofluoride, calcium silicofluoride and sodium borofluoride.

Refractory Aggregate

Various acidic, neutral and basic refractory aggregates are used in the present invention, and an appropriate refractory aggregate is chosen according to the intended use. For example, there may be used $Al_2O_3$-$SiO_2$ type aggregates such as chamotte, agalmatolite, mullite, semisilica aggregate and high-alumina aggregate (pearlite), $SiO_2$ type aggregates such as siliceous stone, $Al_2O_3$ type aggregates such as corundum and other electro-fused alumina, $MgO$-$SiO_2$ type aggregates such as forsterite, and graphite, chrome aggregate, chrome-magnesite aggregate, magnesium-chrome aggregate, magnesia clinker, electrofused magnesia and sintered dolomite. These aggregates may be used singly or in the form of mixtures of two or more.

These refractory aggregates are classified according to known procedures, and coarse fractions having a particle size of 1 to 5 mm and fine fractions having a size smaller than 1 mm are ordinarily mixed so that the coarse fractions occupy 10 to 70% by weight and the fine fractions occupy 90 to 30% by weight in the final refractory aggregate composition. Of course, there may be adopted a method in which the aggregate is pulverized so as to obtain a particle size close to the particle size distribution described above and the pulverized aggregate is directly used as the refractory aggregate without classification.

Compounding

In the present invention, it is important that 1 to 20 parts by weight (all of "parts" and "%" will hereinafter be by weight unles otherwise indicated), especially 3 to 10 parts, of the siliceous binder, 2 to 15 parts, especially 4 to 8 parts, of the organic binder and 0.5 to 20 parts, especially 1.5 to 10 parts, of the phosphate type hardening agent should be incorporated in and mixed with 100 parts of the refractory aggregate. If the amount of the siliceous binder is outside the above range and too small, it sometimes happens that in sufficient binding action is obtained, especially in the intermediate temperature region. If the amount of the siliceous binder is outside the above range and too large, the fire resistance of the final refractory tends to decrease. If the amount of the organic binder is outside the above range and too small, it is difficult to obtain a sufficient binding force in the intermediate temperature region, and if the amount of the organic binder is outside the above range and too large, the texture of the final refractory becomes coarse and heterogeneous because of expansion or blowing. If the amount of the phosphate type hardening agent is outside the above range and too small, the binding force is reduced in the intermediate temperature region and if the amount of the phosphate type hardening agent is outside the above range and too large, the resistance to the melting loss tends to decrease.

Shaping of a refractory from the composition of the present invention is performed according to known procedures except that the refractory composition comprising the above-mentioned three components at the above-mentioned mixing ratio is used.

For example, compounding of the respective components is accomplished by sufficiently mixing the liquid component (siliceous binder solution) with an appropriate amount of the powdery component (for example, the aggregate) to sufficiently wet the surface of the powdery component, incorporating the remaining powdery component into the mixture and sufficiently blending the mixture to form a homogeneous composition. When the amount of the liquid component is insufficient at this compounding step, water or a solvent may additionally be incorporated. Kneading can be accomplished sufficiently at room temperature, but the kneading temperature may be elevated to about 150° C. if desired.

Kneaded composition may be shaped according to various methods, and an appropriate shaping method is chosen according to the intended use. For example, when a refractory of a definite form is prepared, the kneaded composition is shaped into a predetermined form under pressure by a press molding machine or the like. When a refractory has no definite shape, the kneaded composition is applied to the inner side of a furnace, a runner, a ladle or other accessory equipment by optional means such as trowelling, casting, spraying and tamping. Of course, the composition of the present invention may also be used as a refractory adhesive or joint for bonding refractory articles of a definite shape to each other or to other members. Furthermore, the composition of the present invention may be used as a top coating for a preformed refractory article.

The present invention will now be described in detail with reference to the following Examples that by no means limit the scope of the invention. In these Examples, all of "parts" and "%" are by weight unless otherwise indicated.

REFERENTIAL EXAMPLE 1

In this Referential Example, preparation of siliceous binders is described.

The following 7 alkali metal silicate solution (SS-1 through SS-7) were chosen as the starting material of the siliceous binder.

SS-1

Commercially available water glass ($Na_2O$ content=14.3 g/100 ml, $SiO_2$ content=28.9 g/100 ml) prepared by forming a fused cullet from so-called siliceous sand together with soda ash and extracting the cullet with water was chosen and used.

SS-2

Commercially available potassium silicate (K$_2$O content=13.6 g/100 ml, SiO$_2$ content=26.0 g/100 ml) was chosen and used.

SS-3

Commercially available lithium silicate (Li$_2$O content=12.4 g/100 ml, SiO$_2$ content=25.0 g/100 ml) was chosen and used.

SS-4

Magnetite sand slug was chosen as the starting material, and a silicic acid gel was recovered from magnetite sand according to the method disclosed in Japanese Patent Publication No. 33526/70 (Japanese Pat. No. 608,734) and this gel was used as the starting silicic acid component. Then, commercially available solid sodium hydroxide (NaOH) was added to the so recovered silicic acid hydrogel so that the SiO$_2$/Na$_2$O molar ratio was 3.5, and the mixture was reacted at about 80° C. with stirring for about 3 hours to obtain a homogeneous liquid of an alkali metal silicate solution SS-4.

SS-5, SS-6 and SS-7

Easily reactive silicic acid prepared from acid clay according to the method disclosed in Japanese Patent Publication No. 2277/48 (Japanese Pat. No. 178,485) was used as the starting silicic acid component. Then, the so recovered easily reactive silicic acid was dispersed in water so that the solid component concentration (as SiO$_2$) was 30%. In the same manner as described above with reference to S-4, solid sodium hydroxide was added to the dispersion so that the Na$_2$O/SiO$_2$ molar ratio was 0.25, 0.33 or 0.50, and the mixture was reacted by heating with stirring. Thus, there were obtained slightly opaque but homogeneous liquids of special alkali metal silicate solutions SS-5, SS-6 and SS-7.

With respect to each of the so obtained 7 alkali metal silicate solutions, the dehydration gel proportion (F.G., %) was determined according to following method.

Method of determination of dehydration gel proportion (F.G.):

A household mixer was charged with 150 ml of kerosine, and under high speed agitation, 100 g of the alkali metal silicate solution sample was added to sufficiently disperse the sample in kerosine. Then, 50 ml of methanol was added as the dehydration agent to cause dehydration and gelation in the alkali metal silicate. The mixture was discharged from the mixer and it was separated into the liquid comprised mainly of kerosine and the gelation product. The gelation product was classified by a 3-mesh sieve (mesh size=6.68 mm). In the above reaction, the dehydration gelation differed according to the functionality of the alkali metal silicate, and the dehydration gelation product included various gelation products ranging from a dry crumb-like gelation product to an integrated pasty gelation product. The pasty gelation product was left on the sieve, but the dry crumb-like gelation product passed through the sieve. The dehydrated gel proportion (F.G., %) was calculated according to the following formula:

$$F.G. = [(Co - C)/Co] \times 100 \; (\%)$$

wherein C and Co are as defined above.

The obtained results are shown in Table 1.

TABLE 1

| Alkali Metal Silicate Solution | Dehydrated Gel Proportion (F.G., %) |
|---|---|
| SS-1 | 5 |
| SS-2 | 5 |
| SS-3 | 5 |
| SS-4 | 100 |
| SS-5 | 100 |
| SS-6 | 100 |
| SS-7 | 100 |

As the boron-containing siliceous binder having a prolonged pot life, those prepared according to the following method were chosen. The following two alkali metal borate solutions are used as the starting material. More specifically, 3.5 g of commercially available boric anhydride (B$_2$O$_3$) was dissolved under agitation in 100 ml of an aqueous solution of sodium hydroxide (NaOH) having a concentration of 10 g/100 ml to form a homogeneous sodium borate solution (B-N). Similarly, 3.5 g of commercially available boric anhydride was dissolved under agitation into 100 ml of an aqueous solution of potassium hydroxide (KOH) having a concentration of 15 g/100 ml to form a homogeneous potassium borate solution (B-K).

The boron-containing alkali metal silicate solutions were prepared by mixing the above-mentioned alkali metal silicate solution with the alkali metal borate solution, if necessary together with sodium hydroxide (NaOH) and water, under agitation to form intimate mixed solutions in which the molar ratio shown in Table 2 was maintained. Furthermore, 3 kinds of special sodium silicate solutions having an Na$_2$O/SiO$_2$ molar ratio of 0.25, 0.33 or 0.50, which were prepared from the special silicic acid gel obtained by drastically treating acid clay with sulfuric acid, were used. In short, 19 kinds of the siliceous binders shown in Table 2 were prepared.

Moreover, two kinds of comparative samples (SC-1 and SC-2) were similarly prepared and tested with respect to the fluidity stability at dehydration. Results obtained on these comparative samples are shown in Table 2.

The so prepared siliceous binders were tested with respect to the fluidity stability at methanol dehydration according to the following method.

Determination of fluidity stability at dehydration:

A household mixer was charged with 150 ml of kerosine, and under high speed agitation, 100 ml of the sample solution was added to kerosine to sufficiently disperse the sample solution into kerosine. Then, 50 ml of methanol dehydration as the dehydrating agent was added to the dispersion and the mixture was stirred to effect dehydration. The mixture was discharged from the mixer and allowed to stand still. The supernatant composed mainly of kerosine was separated. If the recovered dehydration product lost fluidity and was in the form of a powder or solid cake, it was judged that the sample had no fluidity stability. If the dehydration product retained the fluidity, that is, if the dehydration product was still in the liquid state, the viscosity of the liquid was measured by a viscometer ("Vismetron", synchronous electric rotational viscometer manufactured and supplied by Shibaura System Kabushiki) within the range of from 50 to 1,000,000 cps. It was judged that the sample having a viscosity within this range had a fluidity stability even at dehydration, and this viscosity was adopted as the criterion indicating that the alkali metal silicate binder could retain a fluidity stably for a long time.

The obtained results are shown in Table 2.

TABLE 2

| Siliceous Binder Sample No. | Alkali Metal Silicate | Alkali Metal Borate | $B_2O_3/SiO_2$ Molar Ratio | $M_2O/SiO_2$ Molar Ratio | $SiO_2$ Concentration (% by weight) | Fluidity Stability (cps) at Dehydration |
| --- | --- | --- | --- | --- | --- | --- |
| SSB-1 | SS-1 | B-N | 0.12 | 0.75 | 24.0 | 24200 |
| SSB-2 | SS-4 | B-N | 0.12 | 0.75 | 24.5 | 26400 |
| SSB-3 | SS-5 | B-N | 0.12 | 0.52 | 25.0 | 38000 |
| SSB-4 | SS-5 | B-N | 0.12 | 0.75 | 25.0 | 38500 |
| SSB-5 | SS-5 | B-N | 0.12 | 0.95 | 25.0 | 30500 |
| SSB-6 | SS-5 | B-N | 0.12 | 1.10 | 25.0 | 28000 |
| SSB-7 | SS-5 | B-N | 0.25 | 0.75 | 20.0 | 9800 |
| SSB-8 | SS-5 | B-N | 0.06 | 0.75 | 26.0 | 44000 |
| SSB-9 | SS-5 | B-N | 0.02 | 0.75 | 28.0 | 62000 |
| SSB-10 | SS-1 | B-K | 0.13 | 0.80 | 28.0 | 22000 |
| SSB-11 | SS-4 | B-K | 0.13 | 0.80 | 23.5 | 24400 |
| SSB-12 | SS-5 | B-K | 0.13 | 0.80 | 24.0 | 25000 |
| SSB-13 | SS-5 | B-N | 0.12 | 0.80 | 20.0 | 8600 |
| SSB-14 | SS-5 | B-N | 0.12 | 0.80 | 12.0 | 2100 |
| SSB-15 | SS-5 | — | — | 0.25 | 22.0 | 75000 |
| SSB-16 | SS-6 | — | — | 0.33 | 22.0 | 85000 |
| SSB-17 | SS-7 | — | — | 0.50 | 22.0 | 95000 |
| SSB-18 | SS-2 | B-K | 0.12 | 0.75 | 23.0 | 35000 |
| SSB-19 | SS-3 | B-N | 0.12 | 0.75 | 23.0 | 30000 |
| SC-1(comparison) | SS-1 | — | — | 0.48 | 28.9 | powdery |
| SC-2(comparison) | SS-2 | — | — | 0.29 | 29.0 | pasty |

REFERENTIAL EXAMPLE 2

Three kinds of hardening agents composed mainly of silicon polyphosphate capable of gradually releasing the phosphoric acid component, which are effectively used as the phosphate type hardening agent in the present invention, are described in this Referential Example.

For the manufacture of hardening agent H-1, commercially available sodium silicate ($Na_2O$ content=12.9 g/100 ml, $SiO_2$ content=37.0 g/100 ml) was chosen as the starting material, and partial removal of the sodium component was first conducted. More specifically, this sodium silicate was diluted with water so that the silicic acid component concentration as $SiO_2$ was reduced to 0.25 mole/l, and the dilution was passed at a rate of 10 ml/min through an ion exchange column packed with a cation exchange resin, and the pH value of the recovered solution was adjusted to 10.0 to obtain a sodium silicate solution Ⓐ. The composition of the recovered sodium silicate solution Ⓐ was characterized by an $SiO_2$ concentration of 1.72 g/100 ml, an $Na_2O$ concentration of 0.091 g/100 ml and an $SiO_2/Na_2O$ molar ratio of 1.95. Commercially available phosphoric acid (85% $H_2SO_4$ of the first grade of JIS, specific gravity=1.69) was added to the sodium silicate solution having a pH value of 10 so that the $P_2O_3/SiO_2$ molar ratio was 0.33. The mixture was heated and concentrated to form a dry product. The dry product was temporarily fired at 950° C. for 30 minutes and pulverized so as to obtain a pulverization product capable of passing through a 200-mesh sieve. In order to effect further condensation, the pulverization product was fired again at 900° C. for 3 hours and classified by using a 200-mesh sieve to obtain a sodium-silicon polyphosphate hardening agent H-1.

Hardening agents H-2 and H-3 were prepared in the following manner. The above-mentioned commercially available sodium silicate (No. 3) was dropped to an aqueous solution of sulfuric acid having a concentration of 10%, which was maintained at 90° C. and reaction was conducted under an acidic condition. Sodium ions and sulfuric acid ions were removed from the resulting granular silica gel by washing until the presence of sodium ions was not substantially detected in the washing liquor. Thus, sodium-removed silica hydrogel Ⓑ was recovered (the water content in the hydrogel was 9.25%). The easily reactive silicic acid Ⓒ described above with reference to the preparation of the alkali metal silicate solution, which was a specific silicic acid gel obtained by drastically treating acid clay with sulfuric acid, was used as the sodium-free silicic acid starting material.

In the same manner as described above with reference to the preparation of the above-mentioned silica hydrogel Ⓑ or easily reactive silicic acid Ⓒ was mixed with phosphoric acid so that the $P_2O_5/SiO_2$ molar ratio was 0.33, and the mixture was heated and concentrated to form a dry product. The dry product was pulverized so that the pulverized product passed through a 200-mesh sieve. The pulverized product was sufficiently dried at about 200° C. (for 10 hours) and fired at 950° C. for 1 hour, and the fired product was classified by a 200-mesh sieve. Thus, there were prepared two kinds of silicon polyphosphate hardening agents H-2 (from the silica hydrogel) and H-3 (from the easily reactive silicic acid).

With respect to each of the so prepared inorganic hardening agents, the initial dissolution amount (B) of the phosphoric acid component and the average hydrolysis speed constant (A) were determined according to the following method. The obtained results are shown in Table 3. Method of determination of initial dissolution amount (B) and average hydrolysis speed constant (A):

To 100 ml of a 4 N aqueous solution of sodium hydroxide was added 100 g of the hardening agent sample, and the mixture was stirred at normal temperature (25° C.) When 5 minutes or 120 minutes had passed, the mixture was filtered, and the phosphoric acid component in the filtrate was determined as $P_2O_5$ by colorimetry. The phosphoric acid component dissolved out into the 4 N solution of sodium hydroxide for 5 minutes or 120 minutes was expressed as mg/100 ml. The obtained data were plotted on a graph while plotting the time (minutes) on the abscissa and the dissolution amount (mg/100 ml) of the phosphoric acid component on the ordinate, and the data were substituted in the formula $Y=AX+B$ and the integrated initial dissolution amount (B) of the phosphoric acid component and the average hydrolysis speed constant (A) were calculated.

TABLE 3

| Hardening Agent | Initial Dissolution Amount (B) of Phosphoric Acid Component | Average Hydrolysis Speed Constant (A) |
|---|---|---|
| H-1 | 32 | 0.62 |
| H-2 | 105 | 1.00 |
| H-3 | 102 | 1.10 |

REFERENTIAL EXAMPLE 3

Hardening agents comprising the silicon component and phosphoric acid component at various molar ratios are described in this Referential Example.

As the starting silicon component, there were used the partially sodium-removed sodium silicate solution (Ⓐ) used as the starting material of the hardening agent H-1 and the silica gel prepared under an acidic condition (Ⓑ) used for the hardening agent H-2).

Commercially available phosphoric acid of the first grade as used in Referential Example 2 was used as the starting phosphoric acid component.

As the silicon component/phosphoric acid component molar ratio as $SiO_2/P_2O_5$, there were chosen 2/1, 4/1, 6/1 and 8/1.

In the same manner as described in Referential Example 2, mixtures of both the starting materials were calcined at 900° C. for 1 hour and then pulverized to form 8 kinds of silicon polyphosphate hardening agents H-4, H-5, H-6, H-7, H-8, H-0, H-10 and H-11.

With respect to each of the so prepared eight hardening agents, the initial dissolution amount (B) of the phosphoric acid component and the average hydrolysis speed constant (A) were determined. The obtained results are shown in Table 4.

TABLE 4

| Molar Ratio ($SiO_2:P_2O_5$) | Starting Material of Silicon Component | Sample No. | Initial Dissolution Amount (B) of Phosphoric Acid Component | Average Hydrolysis Speed Constant (A) |
|---|---|---|---|---|
| 2:1 | sodium silicate solution Ⓐ | H-4 | 30 | 1.04 |
|  | silica gel Ⓑ | H-5 | 193 | 1.02 |
| 4:1 | sodium silicate solution Ⓐ | H-6 | 43 | 0.42 |
|  | silica gel Ⓑ | H-7 | 97 | 1.08 |
| 6:1 | sodium silicate solution Ⓐ | H-8 | 72 | 0.33 |
|  | silica gel Ⓑ | H-9 | 66 | 1.12 |
| 8:1 | sodium silicate solution Ⓐ | H-10 | 85 | 0.31 |
|  | silica gel Ⓑ | H-11 | 47 | 1.16 |

REFERENTIAL EXAMPLE 4

Hardening agents composed mainly of an alkali metal salt of silicon polyphosphate are illustrated in this Referential Example.

The partially sodium-removed silica Ⓑ prepared by carrying out the reaction under acidic condition, which was described in Referential Example 2, was used as the starting silicon component.

An alkali metal hydroxide was added to the silica gel Ⓑ in such an amount that the amount of the alkali metal component as $Na_2O$ or $K_2O$ was 1, 3, 5, 7 or 10% based on the silicon component as $SiO_2$, and the mixture was sufficiently blended and heat-treated at 200° C. for 1 hour.

In the same manner as described in Referential Example 2, the silica gel reacted with the alkali metal component was mixed with commercially available phosphoric acid of the first grade so that the amount of the phosphoric acid as $P_2O_5$ was 0.25 or 0.33 per mole of the silicon component as $SiO_2$. The mixture was fired at 900° C. for 2 hours and pulverized. Thus, 15 kinds of alkali metal salts of silicon polyphosphate (H-12 through H-26) were prepared.

With respect to the so prepared 15 alkali metal salts of silicon polyphosphate, the initial dissolution amount (B) of the phosphoric acid component and the average hydrolysis speed constant (A) were determined. The obtained results are shown in Table 5.

TABLE 5

| Amount (%) of Alkali Metal Added | Kind of Alkali Metal | $P_2O_5/SiO_2$ Molar Ratio | Sample No. | Initial Dissolution Amount (B) of Phosphoric Acid Component | Average Hydrolysis Speed Constant (A) |
|---|---|---|---|---|---|
| 1 | Na | 0.25 | H-12 | 88 | 1.03 |
|  | Na | 0.33 | H-13 | 94 | 0.82 |
|  | K | 0.33 | H-14 | 91 | 0.79 |
| 3 | Na | 0.25 | H-15 | 34 | 0.98 |
|  | Na | 0.33 | H-16 | 42 | 0.63 |
|  | K | 0.33 | H-17 | 40 | 0.65 |
| 5 | Na | 0.25 | H-18 | 31 | 0.97 |
|  | Na | 0.33 | H-19 | 33 | 0.62 |
|  | K | 0.33 | H-20 | 31 | 0.62 |
| 7 | Na | 0.25 | H-21 | 55 | 0.97 |
|  | Na | 0.33 | H-22 | 56 | 0.77 |
|  | K | 0.33 | H-23 | 54 | 0.78 |
| 10 | Na | 0.25 | H-24 | 87 | 1.05 |
|  | Na | 0.33 | H-25 | 82 | 0.84 |
|  | K | 0.33 | H-26 | 85 | 0.87 |

REFERENTIAL EXAMPLE 5

Various hardening agents composed of silicon polyphosphate or its alkali metal salt, which were prepared by using various silicic acids, silicates and clay minerals as the starting silicon component are described in this Referential Example.

As the silicic acid, there were chosen and used the following 4 kinds of silicic acids; siliceous sand powder ($SiO_2=99.9\%$, $Al_2O_3=0.04\%$, $Fe_2O_3=0.008\%$) prepared by finely pulverizing siliceous sand produced in Australia so that the particle size was below $10\mu$, silica xerogel powder ($SiO_2=97.0\%$, $Al_2O_3=3.0\%$) obtained by firing granular silica gel marketed as a drying adsorbent at 300° C., pulverizing the fired product and classifying the fired product to obtain a product having a particle size below $10\mu$, finely divided silica having a particle size below $0.1\mu$, which was marketed as a filler for a plastic material such as rubber (ordinarily called "white carbon"), and acid-treated active clay ($SiO_2=94.3\%$, $Al_2O_3=1.49\%$, $Fe_2O_3=0.39\%$, ignition loss=3.36%) obtained by drastically treating a montmorillonite type acid clay with sulfuric acid to remove acid-soluble basic components.

As the silicate, there were chosen and used the following 7 kinds of silicates; aluminum silicate [$Al_2Si_4O_{10}(OH)_2$], calcium silicate ($CaO \cdot 2SiO_2$), magnesium silicate ($Mg_2Si_3O_8 \cdot 2H_2O$), sodium silicate ($0.1Na_2O \cdot SiO_2$), zinc silicate ($ZnO \cdot 6SiO_2$), barium silicate ($BaO \cdot 4SiO_2$) and zirconium silicate ($ZrO_2 \cdot SiO_2$).

As the clay mineral, there were chosen and used the following 5 kinds of clays; kaolin (main component composition on the dry basis; $SiO_2=79.4\%$, $Al_2O_3=17.6\%$, $CaO=0.38\%$, $MgO=0.26\%$, $Fe_2O_3=0.02\%$, ignition loss=3.34%) as the phyllosilicate layer structure clay, acid clay of the montmorillonite group (main component composition on the dry basis: $SiO_2=78.7\%$, $Al_2O_3=13.1\%$, $Fe_2O_3=0.57\%$, $CaO=1.13\%$, $MgO=3.50\%$, ignition loss=3.15%) as the ordinary clay, zeolite (main component composition: $SiO_2=66.1\%$, $Al_2O_3=11.9\%$, $Fe_2O_3=0.40\%$, $CaO=2.03\%$, $MgO=0.04\%$, $TiO_2=0.04\%$, $Na_2O=2.07\%$, $K_2O=2.05\%$, ignition loss=15.9%) as the natural zeolite, diatomaceous earth (main component composition: $SiO_2=79.6\%$, $Al_2O_3=6.37\%$, $Fe_2O_3=3.03\%$, $CaO=0.16\%$, $MgO=11.3\%$, ignition loss=8.36%) as the natural infinitive shape silicate, and talc (main component composition: $SiO_2=61.7\%$, $MgO=30.5\%$, $Al_2O_3=0.63\%$, $Fe_2O_3=1.96\%$, ignition loss=5.50%) as the phyllosilicate.

When the starting silicic acid or silicate did not contain a sodium component or contained only a small amount of a sodium component, sodium hydroxide (NaOH) was added as indicated in Table 6 so that the content of sodium hydroxide as $Na_2O$ was 3% based on the silicon component as $SiO_2$. Separately, such starting material was used directly without addition of NaOH. Each starting material was heat-treated at 200° C. Thus, the silicic acid or silicate starting materials in which the alkali metal was incorporated or not incorporated were prepared.

Commercially available phosphoric acid of the first grade as used in Referential Example 2 was chosen and used as the starting phosphoric acid component.

In each of the silicic acids, silicates and minerals, the molar ratio of the silicon component to the phosphoric acid component was such that the $SiO_2/P_2O_5$ molar ratio was 3/1. In case of the silicates or minerals, the phosphoric acid component was additionally added so that ortho-salts of the contained basic components were formed.

The hardening agents were prepared in the same manner as described in Referential Example 2, and calcination was carried out at 900° C. for 2 hours. Thus, 27 kinds of silicon polyphosphates and alkali metal salts thereof (H-27 through H-53) were prepared.

With respect to these 27 hardening agents, the initial dissolution amount (B) of the phosphoric acid component and average hydrolysis speed constant (A) were determined. The obtained results are shown in Table 6.

TABLE 6

| Starting Silicon Component | Addition of Sodium Hydroxide | Sample No. | Initial Dissolution Amount (B) | Average Hydrolysis Speed Constant (A) |
|---|---|---|---|---|
| finely divided siliceous sand | not | H-27 | 134 | 1.12 |
| finely divided siliceous sand | effected | H-28 | 64 | 0.77 |
| silica xerogel | not | H-29 | 107 | 1.02 |
| silica xerogel | effected | H-30 | 33 | 0.66 |
| finely divided silica | not | H-31 | 98 | 0.97 |
| finely divided silica | effected | H-32 | 31 | 0.64 |
| acid-treated acid clay | not | H-33 | 102 | 1.10 |
| acid-treated acid clay | effected | H-34 | 36 | 0.65 |
| aluminum silicate | not | H-35 | 185 | 0.42 |
| aluminum silicate | effected | H-36 | 165 | 0.38 |
| calcium silicate | not | H-37 | 105 | 0.65 |
| calcium silicate | effected | H-38 | 77 | 0.53 |
| magnesium silicate | not | H-39 | 175 | 0.58 |
| magnesium silicate | effected | H-40 | 155 | 0.33 |
| sodium silicate | not | H-41 | 96 | 1.12 |
| sodium silicate | effected | H-42 | 105 | 0.92 |
| zinc silicate | not | H-43 | 186 | 0.85 |
| zinc silicate | effected | H-44 | 163 | 0.58 |
| barium silicate | not | H-45 | 104 | 0.67 |
| barium silicate | effected | H-46 | 73 | 0.56 |
| zirconium silicate | not | H-47 | 32 | 0.42 |
| zirconium silicate | effected | H-48 | 27 | 0.38 |
| kaolin | not | H-49 | 194 | 0.52 |
| acid clay | not | H-50 | 127 | 0.67 |
| zeolite | not | H-51 | 66 | 0.57 |
| diatomaceous earth | not | H-52 | 175 | 0.62 |
| talc | not | H-53 | 190 | 0.58 |

REFERENTIAL EXAMPLE 6

Hardening agents composed mainly of alkali metal silicon phosphates which are prepared from oxyacids of phosphorus or oxyacid salts of phosphorus as the starting phosphoric acid component are described in this Referential Example.

The sodium silicate solution Ⓐ from which sodium was partially removed by the ion exchange resin, which was used in Referential Example 2, and sodium-free silica gel Ⓑ obtained by conducting the reaction under an acidic condition, which was used in Referential Example 2, were used as the starting silicon component.

So-called crude phosphoric acid ($P_2O_5=24.9\%$, $Fe_2O_3+Al_2O_3=1.19\%$, $CaO=1.54\%$) obtained by decomposition of phosphate rock with sulfuric acid, commercially available oxyacids of phosphorus of the reagent grade, such as phosphoric anhydride ($P_2O_5$), metaphosphoric acid ($HPO_3$), pyrophosphoric acid ($H_4P_2O_7$) and phosphorous acid ($H_3PO_3$), and commercially available phosphorus oxyacid salts of the reagent grade, such as monoammonium orthophosphate ($NH_4H_2PO_4$), monosodium orthophosphate ($NaH_2PO_4 \cdot H_2O$), sodium pyrophosphate ($Na_4P_2O_7 \cdot 10H_2O$), sodium hexametaphosphate [$(NaPO_3)_6$], potassium metaphosphate ($KPO_3$), potassium orthophosphate ($K_3PO_4$), sodium tripolyphosphate ($Na_5P_3O_5$), sodium phosphite ($Na_2HPO_3 \cdot 5H_2O$), potassium hypophosphite ($KH_2PO_2$), zinc phosphate ($ZnHPO_4$), magnesium phosphate ($MgHPO_4$), iron phosphate ($FePO_4 \cdot nH_2O$) and calcium phosphate [$Ca(H_2PO_4) \cdot 2H_2O$] were chosen and used as the starting phosphoric acid component.

When the starting phosphoric acid component was an alkali metal salt, the silica gel Ⓑ was chosen as the starting silicon component, and the alkali metal component as $Na_2O$ or $K_2O$ was added in an amount of 4.0% based on $SiO_2$ through the starting alkali metal salt and an additional amount of commercially available phosphoric acid of the first grade (85%) was added so that the $SiO_2/P_2O_5$ molar ratio was 3/1. When the starting phosphoric acid component was crude phosphoric acid, an oxyacid of phosphorus or other phosphate, the sodium silicated solution A obtained by partial removal of sodium was used as the silicon component so that the SiO2/P2O5 molar ratio was 3/1. Both the starting components were mixed, and the mixture was concentrated and dried if necessary and calcined 900° C. for 3 hours, followed by pulverization. Thus, 19 kinds of alkali metal silicon polyphosphate hardening agents (H-54 through H-72) were prepared.

With respect to each of these 19 hardening agents, the initial dissolution amount (B) of the phosphoric acid component and the average hydrolysis speed constant (A) were determined. The obtained results are shown in Table 7.

TABLE 7

| Starting Silicon Component | Starting Phosphoric Acid Component | Sample No. | Initial Dissolution Amount (B) | Average Hydrolysis Speed Constant (A) |
|---|---|---|---|---|
| sodium-containing silica gel Ⓐ | crude phosphoric acid | H-54 | 44 | 0.64 |
| | phosphoric anhydride | H-55 | 38 | 0.61 |
| | metaphosphoric acid | H-56 | 35 | 0.63 |
| | pyrophosphoric acid | H-57 | 30 | 0.67 |
| | phosphorous acid | H-58 | 33 | 0.71 |
| | monoammonium orthophosphate | H-59 | 37 | 0.65 |
| | zinc phosphate | H-60 | 105 | 0.58 |
| | magnesium phosphate | H-61 | 178 | 0.49 |
| | aluminum phosphate | H-62 | 189 | 0.42 |
| | iron phosphate | H-63 | 75 | 0.65 |
| | calcium phosphate | H-64 | 78 | 0.58 |
| | monosodium orthophosphate | H-65 | 32 | 0.64 |
| | sodium pyrophosphate | H-66 | 34 | 0.64 |
| | sodium hexametaphosphate | H-67 | 33 | 0.63 |
| silica gel Ⓑ | potassium metaphosphate | H-68 | 32 | 0.60 |
| | potassium orthophosphate | H-69 | 31 | 0.61 |
| | sodium tripolyphosphate | H-70 | 35 | 0.67 |
| | sodium phosphate | H-71 | 36 | 0.65 |
| | potassium hypophosphite | H-72 | 34 | 0.66 |

REFERENTIAL EXAMPLE 7

This Referential Example illustrates influences of the heat treatment conducted at the step of preparing silicon polyphosphate or its alkali metal salt.

The starting materials used for the hardening agent H-1, H-2 or H-3 shown in Referential Example 2 were mixed and concentrated and dried by heating, and the mixture was calcined at 500° or 600° C. for 24 hours or at 750°, 800° or 950° C. for 3 hours, followed by pulverization. Thus, 15 kinds of hardening agents (H-73 through H-87) composed mainly of silicon polyphosphate or its alkali metal salt were prepared.

With respect to each of these 15 hardening agents, the initial dissolution amount (B) of the phosphoric acid component and the average hydrolysis speed constant (A) were determined. The obtained results are shown in Table 8.

TABLE 8

| Heat Treatment Temperature (°C.) | Starting Materials | Sample No. | Initial Dissolution Amount (B) | Average Hydrolysis Speed Constant (A) |
|---|---|---|---|---|
| 500 | H-1 | H-73 | 265 | 0.60 |
| | H-2 | H-74 | 280 | 0.55 |
| | H-3 | H-75 | 290 | 0.20 |
| 600 | H-1 | H-76 | 218 | 0.89 |
| | H-2 | H-77 | 226 | 0.94 |
| | H-3 | H-78 | 245 | 1.06 |
| 750 | H-1 | H-79 | 118 | 0.62 |
| | H-2 | H-80 | 129 | 0.74 |
| | H-3 | H-81 | 148 | 0.80 |
| | H-1 | H-82 | 53 | 0.52 |

TABLE 8-continued

| Heat Treatment Temperature (°C.) | Starting Materials | Sample No. | Initial Dissolution Amount (B) | Average Hydrolysis Speed Constant (A) |
|---|---|---|---|---|
| 800 | H-2 | H-83 | 66 | 0.58 |
| | H-3 | H-84 | 72 | 0.58 |
| | H-1 | H-85 | 25 | 0.31 |
| 950 | H-2 | H-86 | 27 | 0.32 |
| | H-3 | H-87 | 33 | 0.36 |

REFERENTIAL EXAMPLE 8

Hardening agents composed mainly of other metal salts of phosphorus oxyacids having a property of gradually releasing the phosphoric acid component are described in this Referential Example.

As the metal component, there were chosen the following 10 metals; magnesium, calcium, strontium, barium, aluminum, titanium, zirconium, tin, lead and zinc. Commercially available compounds of these metals of the reagent grade shown in Table 9 were used as the starting material.

Commercially available phosphoric acid of the first grade (85%) as used in Referential Example 2 was used as the phosphoric acid component.

The molar ratio of both the starting materials based on the oxides [$MO_{q/2}P_2O_5$ (in which M stands for the metal atom and q stands for the valency)] was as shown in Table 9.

In case of samples H-89, H-90, H-91 and H-92, calcination was carried out at 300° C. for 5 hours and the calcination product was finely pulverized. In case of other samples, the mixture of the starting materials was calcined at 500° C. for 10 hours, pulverized, calcined again at 850° to 950° C. for 5 hours and pulverized. Each pulverization product was classified by a 200-mesh (74μ) sieve. Thus, 15 kinds of finely pulverized hardening agents composed mainly of a polyphosphoric acid salt (H-88 through H-104) were prepared.

With respect to each of these 15 hardening agents, the initial dissolution amount (B) of the phosphoric acid component and the average hydrolysis speed constant (A) were determined. The obtained results are shown in Table 9.

TABLE 9

| Starting Metal Compound | Molar Ratio ($MO_{q/2}:P_2O_5$) | Sample No. | Initial Dissolution Amount (B) | Average Hydrolysis Speed Constant (A) |
|---|---|---|---|---|
| magnesium carbonate | 3:1 | H-88 | 31 | 0.23 |
| calcium carbonate | 2:1 | H-89 | 38 | 0.17 |
| calcium carbonate | 3:1 | H-90 | 25 | 0.15 |
| strontium carbonate | 2:1 | H-91 | 11 | 0.17 |
| barium hydroxide | 2:1 | H-92 | 10 | 0.17 |
| aluminum hydroxide | 1:1 | H-93 | 275 | 0.29 |
| aluminum hydroxide | 2:1 | H-94 | 240 | 0.40 |
| titanium oxysulfate | 1:1 | H-95 | 105 | 1.30 |
| titanium oxychloride | 3:1 | H-96 | 38 | 0.88 |
| zirconium oxychloride | 1:1.5 | H-97 | 117 | 1.32 |
| tin oxychloride | 3:1 | H-98 | 220 | 1.10 |
| litharge | 2:1 | H-99 | 285 | 1.05 |
| zirconium hydroxide | 1:1.5 | H-100 | 84 | 1.22 |
| zinc flower | 3:1 | H-101 | 240 | 1.20 |
| zinc flower | 4:1 | H-102 | 90 | 1.10 |

REFERENTIAL EXAMPLE 9

Natural phosphate rocks shown in Table A were calcined at 900° C. for 3 hours and then pulverized (to sizes capable of passing through a 200-mesh sieve) to obtain hardening agents H-103 through H-105. Furthermore, commercially available calcium phosphate (CaHPO$_4$) (H-106) was chosen as the hardening agent.

Natural phosphate rock powders produced in Florida (USA), Kola (USSR) and Morocco were used as the starting phosphate rock. Chemical compositions (% by weight) of these phosphate rocks are shown in Table A.

TABLE A

| Phosphate Rock | Produced in Florida | Produced in Kola | Produced in Morocco |
|---|---|---|---|
| Sample No. | H-103 | H-104 | H-105 |
| Chemical Composition (%) | | | |
| P$_2$O$_5$ | 36.34 | 38.86 | 36.62 |
| CaO | 51.14 | 51.39 | 52.89 |
| R$_2$O$_3$ | 2.05 | 1.23 | 0.68 |
| (Al$_2$O$_3$ + Fe$_2$O$_3$) | | | |
| F | 4.20 | 3.36 | 4.29 |
| SiO$_2$ | 4.62 | 1.02 | 3.26 |

REFERENTIAL EXAMPLE 10

An embodiment in which a phosphate type hardening agent is formed in advance in a refractory aggregate is described in this Referential Example.

Sea water magnesia clinker was chosen as the refractory aggregate. As the intermediate for fixing the phosphoric acid component as the hardening agent, magnesium hydroxide was chosen and used.

The intermediate of sea water magnesia clinker having the following composition (based on the oxides): SiO$_2$=3.0%, Al$_2$O$_3$=0.8%, Fe$_2$O$_3$=0.8%, CaO=2.6%, MgO=93.5%, ignition loss=0.1%.

Commercially available phosphoric acid of the first grade diluted to 10% was added to the above sea water magnesia clinker intermediate so that the MgO/P$_2$O$_5$ molar ratio was 25/1 and they were sufficiently blended to form a homogeneous mixture. In the same manner as described in Referential Example 2, the mixture was preliminarily calcined at 900° C. for 1 hour, then calcined at 1500° C. for 2 hours and pulverized to a size capable of passing through a 200-mesh sieve to obtain a refractory aggregate having a phosphate type hardening agent (H-107) fixed thereon.

The initial dissolution amount (B) of the phosphoric acid component and the average hydrolysis speed constant (A) of this phosphate type hardening agent reacted and included in advance in the refractory aggregate were similar to those of the samples H-88 and H-89.

REFERENTIAL EXAMPLE 11

Carbonizable organic binders are mentioned in this Referential Example.

Dextrin, starch, gum arabic, molasse and casein were chosen among natural pastes.

Cellulose (CMC), Poval (PVA), sodium alginate, a vinyl acetate emulsion and an isobutylene-maleic acid copolymer were chosen among synthetic starches.

Phenolic resins [powdery resin (PRP) and liquid resin], an epoxy resin and a urethane resin were chosen among synthetic resins.

Pitch, tar, asphalt and anthracene oil were chosen among petroleum and coal fractions.

EXAMPLE 1

A typical instance of a refractory composition free of a binder, that is, a magnesia brick composition, will first be described.

The standard mixing ratio (standard recipe) of this refractory composition is as follows:

| | |
|---|---|
| Natural magnesia clinker (1–4 mm in size) | 10 to 20 parts |
| Natural magnesia clinker (less than 1 mm in size) | 50 to 70 parts |
| Sea water magnesia clinker (less than 0.074 mm in size) | 5 to 15 parts |
| Kibushi-clay powder (composed mainly of keolin) | 4 to 8 parts |
| Soil-like graphite powder | 4 to 8 parts |
| Asbestos (inorganic fiber) | 2 to 5 parts |

The foregoing components were charged in a small slurry mixer so that the total amount was 100 parts, and 45 to 60 parts of water was added to the above aggregate composition. The mixer was started to stir the mixture and obtain a homogeneous slurry.

The slurry was dehydrated and molded by using a molding frame and molding machine described below. A box having a square bottom (90 mm×300 mm×300 mm) was used as the molding frame, and an 80-mesh metal net was placed on a bottom steel plate having many holes 10 mm in diameter (⅓ of the area was occupied by these holes). The above-mentioned aggregate slurry was charged into the molding frame and a lid (top plate) was set on the frame. Dehydration molding was carried out under a pressure of 2.5 to 3.5 Kg/cm$^2$. The molded article was taken out from the molding frame and allowed to stand still in a heating atmosphere maintained at about 105° C. to obtain a sample of a refractory composition.

Examples of the present invention will now be described based on the above standard operation.

A magnesia type board (hereinafter referred to as "MB") was used as the unfired refractory composition. The aggregate composition of MB is as follows:

| | |
|---|---|
| Natural magnesia clinker (1–4 mm in size) | 15 parts |
| Natural magnesia clinker (less than 1 mm in size) | 60 parts |
| Sea water magnesia clinker (less than 0.074 mm in size) | 10 parts |
| Kibushi-clay powder | 6 parts |
| Soil-like graphite powder | 6 parts |
| Asbestos | 3 parts |
| Total | 100 parts |

The above MB aggregate composition was charged in a small mixer and was blended to form a homogeneous mixture, and the formed MB aggregate was analyzed to obtain the following results.

| | |
|---|---|
| MgO | 82.74% |
| Al$_2$O$_3$ | 2.28% |
| SiO$_2$ | 4.65% |
| Fe$_2$O$_3$ | 1.98% |
| CaO | 2.25% |
| ignition loss | 6.15% |

A binder (comprising a siliceous binder, a carbonizable organic binder and a phosphate type hardening agent) shown in Table 10 was added to 100 parts of the so formed MB aggregate in the small mixer in an amount shown in Table 10 (parts per 100 parts of the aggregate; amounts of binders will be expressed in this manner in the subsequent Examples, unless otherwise indicated). Water was added to the mixture so that the total amount of water inclusive of water contained in the binder was 55 parts. The entire mixture was stirred in the mixer to form a green composition for a magnesia board. Then, the green composition was filled on a molding frame and subjected to dehydration molding by a dehydrating molding machine to form a test piece having a size of 30 mm × 300 mm × 300 mm. The test piece was cut into appropriate sizes suitable for respective tests described below, and the following 9 tests (some of them were appropriately chosen and conducted according to the test objects in some runs) were conducted according to the methods described below to know whether or not the product could be practically used as the unfired refractory.

In runs Nos. 1-141 and 1-142, since the phosphate type hardening agent was incorporated into sea water magnesia clinker in advance (H-107), in order to make the hardening agent present in an amount of 0.01 mole as $P_2O_5$, the amount of MgO contained in H-107 was subtracted from the amount of the sea water magnesia clinker, and the obtained value was used as the basic aggregate amount.

The obtained results are shown in Table 10.
The test items and test methods are as follows.

Flexural Strength

Twenty test pieces having a size of 20 mm × 50 mm × 150 mm were tested at a measurement temperature of 105°, 300°, 800° or 1200° C. When the measurement was carried out at 105° or 300° C., a nichrome wire drying furnace was used, and when the measurement temperature was 800° or 1200° C., a resistance heating element type electric furnace was used. Each test piece was maintained at the predetermined temperature for 2 hours, and was then naturally cooled to room temperature. While the distance between fulcrum points was adjusted to 100 mm, an intermediate point was compressed and the applied weight causing breakage was measured. The flexural strength (Kg/cm²) was calculated according to the formula of JIS.

Compressive Strength

Twenty test pieces having a size of 30 mm × 30 mm × 30 mm were tested at a measurement temperature of 105°, 300°, 800° or 1200° C. Each test piece was maintained at a predetermined temperature for 2 hours, and the compressive strength (Kg/cm²) was measured by an Amsler tester.

Softening Point under Load

One test piece having a diameter of 30 mm and a height of 30 mm was tested in an Ender type softening point tester in a nitrogen atmosphere while the temperature was elevated at a rate of 10° C./min. The softening point $T_2$ (° C.) under load was thus determined.

Thermal Linear Expansion or Contraction

Two test pieces having a diameter of 10 mm and a height of 50 mm were placed in a nitrogen atmosphere while the temperature was elevated at a rate of 10° C./min, and the linear contraction (%) at 1000° C. was measured by a thermal expansion or contract tester of the resistance heating element type.

Thermal Flexural Strength

Two test pieces having a size of 20 mm × 30 mm × 120 mm were placed on a supporting stand of in an electric furnace of the resistance heating element type so that the distance between fulcrum points was 100 mm. The test pieces were heated at 1450° C. and the intermediate point between the fulcrum points was compressed to determine the total load causing breakage. The flexural strength was calculated according to the following formula:

$$\gamma = (3 \times w \times i)/(2 \times b \times d^2)$$

wherein $\gamma$ stands for the flexural strength (Kg/cm²), b stands for the width (mm) of the test piece, d stands for the thickness (mm) of the test piece, w stands for the total weight and i stands for the distance between fulcrum points.

Apparent Porosity (%), Water Absorption (%), Apparent Specific Gravity (g/cc) and Bulk Density (g/cc)

These properties were determined according to the methods of JIS r-2205.

In order to clearly demonstrate the effects attained by the present invention, test pieces were prepared from the following comparative compositions (C-11 through C-20) and were similarly tested. The obtained results are shown in Table 10.

In comparative composition C-11, the binder was not added at all but a 5% solution of CMC was added in an amount of 40 parts instead of water in the standard composition so as to maintain a moldability in the MB aggregate. The composition was molded in the same manner as described above to obtain test pieces.

In comparative compositions C-12, C-13, C-14 and C-15, the binders shown in Table 10 were incorporated in amounts shown in Table 10, and the resulting compositions were molded in the same manner as described above to obtain test pieces.

In comparative compositions C-16, C-17 and C-18, binders outside the scope of the present invention were used. More specifically, commercially available sodium silicate called water glass No. 3 (sample SS-1) was incorporated as the siliceous binder in the composition C-16, and commercially available diammonium hydrogen phosphate [$(NH_4)_2HPO_4$] (sample HC-7) having a high water-solubility and sodium pyrophosphate ($Na_2P_2O_7 \cdot 10H_2O$) (sample HC-6) were incorporated in comparative compositions C-17 and C-18, respectively. Each composition was similarly molded to obtain test pieces.

TABLE 10

| Run No. | C-11 (comparison) | C-12 (comparison) | C-13 (comparison) | C-14 (comparison) | C-15 (comparison) | C-16 (comparison) | C-17 (comparison) | C-18 (comparison) | C-19 (comparison) | C-20 (comparison) |
|---|---|---|---|---|---|---|---|---|---|---|
| Siliceous Binder | | | | | | | | | | |
| Sample No. | — | SSB-4 | — | — | SSB-4 | SS-1 (SC-1) | SSB-4 | SSB-4 | SS-1 (SC-1) | SS-2 (SC-2) |

TABLE 10-continued

| Amount (parts) Carbonizable Organic Binder | 0 | 6 | 0 | 0 | 6 | 6 | 6 | 6 | 6 | 6 |
|---|---|---|---|---|---|---|---|---|---|---|
| Kind | — | — | PRP | — | — | — | — | — | PRP | PRP |
| Amount (parts) Phosphate Type Hardening Agent | 0 | 0 | 6 | 0 | 0 | 0 | 0 | 0 | 6 | 6 |
| Sample No. | — | — | — | H-3 | H-3 | H-3 | HC-7 | HC-6 | H-3 | H-3 |
| Amount (parts) | 0 | 0 | 0 | 3 | 3 | 3 | 3 | 3 | 3 | 3 |
| Bulk Density (g/cc) | 1.70 | 1.70 | 1.70 | 1.70 | 1.70 | 1.68 | 1.65 | 1.65 | 1.70 | 1.70 |
| Apparent Porosity (%) | 45.0 | 45.0 | 45.0 | 45.0 | 45.0 | 50.0 | 52.0 | 52.0 | 45.0 | 45.0 |
| Flexural Strength (Kg/cm$^2$) | | | | | | | | | | |
| 105° C. | 3.5 | 8.5 | 3.5 | 3.5 | 12.3 | 8.0 | 6.0 | 6.0 | 9.8 | 10.2 |
| 300° C. | 3.5 | 8.9 | 11.2 | 3.5 | 25.0 | 3.5 | 3.5 | 3.5 | 5.6 | 6.0 |
| 800° C. | 3.8 | 3.5 | 0 | 3.7 | 5.5 | 3.8 | 3.8 | 3.8 | 0 | 0 |
| 1200° C. | 4.2 | 4.3 | 1.2 | 3.7 | 8.2 | 4.5 | 4.5 | 4.5 | 4.3 | 4.5 |
| Thermal Linear Expansion or Contraction (%) | 0.80 | 1.70 | 0.90 | 2.50 | 2.70 | 2.70 | 2.70 | 2.70 | 0.90 | 0.90 |

| Run No. | 1-1 | 1-2 | 1-3 | 1-4 | 1-5 | 1-6 | 1-7 | 1-8 | 1-9 | 1-10 |
|---|---|---|---|---|---|---|---|---|---|---|
| Siliceous Binder | | | | | | | | | | |
| Sample No. | SSB-4 | SSB-4 | SSB-4 | SSB-4 | SSB-4 | SSB-4 | SSB-4 | SSB-4 | SSB-4 | SSB-4 |
| Amount (parts) Carbonizable Organic Binder | 10 | 8 | 6 | 4 | 3 | 6 | 6 | 6 | 8 | 4 |
| Kind | PRP | PRP | PRP | PRP | PRP | PRP | PRP | PRP | PRP | PRP |
| Amount (parts) Phosphate Type Hardening Agent | 6 | 6 | 6 | 6 | 6 | 10 | 8 | 4 | 8 | 4 |
| Sample No. | H-3 | H-3 | H-3 | H-3 | H-3 | H-3 | H-3 | H-3 | H-3 | H-3 |
| Amount (parts) | 5 | 4 | 3 | 2.5 | 2 | 3 | 3 | 3 | 4 | 2.5 |
| Bulk Density (g/cc) | 1.70 | 1.70 | 1.70 | 1.70 | 1.70 | 1.70 | 1.70 | 1.70 | 1.70 | 1.70 |
| Apparent Porosity (%) | 45.0 | 45.0 | 45.0 | 45.0 | 45.0 | 45.0 | 45.0 | 45.0 | 45.0 | 45.0 |
| Flexural Strength (Kg/cm$^2$) | | | | | | | | | | |
| 105° C. | 15.0 | 14.3 | 13.0 | 11.7 | 11.1 | 13.0 | 13.0 | 13.0 | 14.5 | 11.8 |
| 300° C. | 31.1 | 29.7 | 27.0 | 24.0 | 21.0 | 28.5 | 27.5 | 26.5 | 30.0 | 24.2 |
| 800° C. | 5.7 | 5.6 | 5.5 | 5.2 | 4.5 | 4.2 | 4.6 | 5.2 | 5.0 | 5.0 |
| 1200° C. | 7.5 | 7.4 | 7.2 | 7.0 | 6.7 | 6.5 | 6.8 | 7.0 | 6.9 | 6.8 |
| Thermal Linear Expansion or Contraction (%) | 11.0 | 0.90 | 0.80 | 0.80 | 0.80 | 0.78 | 0.80 | 0.80 | 0.90 | 0.80 |

| Run No. | 1-11 | 1-12 | 1-13 | 1-14 | 1-15 | 1-16 | 1-17 | 1-18 | 1-19 | 1-20 |
|---|---|---|---|---|---|---|---|---|---|---|
| Siliceous Binder | | | | | | | | | | |
| Sample No. | SSB-4 | SSB-4 | SSB-4 | SSB-4 | SSB-4 | SSB-4 | SSB-4 | SSB-4 | SSB-4 | SSB-4 |
| Amount (parts) Carbonizable Organic Binder | 6 | 6 | 6 | 6 | 6 | 6 | 6 | 6 | 6 | 6 |
| Kind | PRP | PRP | PRP | PRP | PRP | PRP | PRP | PRP | PRP | PRP |
| Amount (parts) Phosphate Type Hardening Agent | 6 | 6 | 6 | 6 | 6 | 6 | 6 | 6 | 6 | 6 |
| Sample No. | H-1 | H-2 | H-4 | H-5 | H-6 | H-7 | H-8 | H-9 | H-10 | H-11 |
| Amount (parts) | 6 | 4 | 6 | 3 | 5 | 3 | 4 | 4 | 4 | 6 |
| Bulk Density (g/cc) | 1.70 | 1.70 | 1.70 | 1.70 | 1.70 | 1.70 | 1.70 | 1.70 | 1.70 | 1.70 |
| Apparent Porosity (%) | 45.0 | 45.0 | 45.0 | 45.0 | 45.0 | 45.0 | 45.0 | 45.0 | 45.0 | 45.0 |
| Flexural Strength (Kg/cm$^2$) | | | | | | | | | | |
| 105° C. | 13.0 | 13.5 | 13.0 | 11.8 | 12.7 | 11.9 | 12.3 | 12.6 | 12.5 | 13.0 |
| 300° C. | 27.0 | 27.2 | 27.0 | 26.4 | 27.0 | 26.5 | 26.6 | 25.8 | 26.0 | 27.0 |
| 800° C. | 5.4 | 5.6 | 5.5 | 5.5 | 5.6 | 5.5 | 5.5 | 5.5 | 5.5 | 5.5 |
| 1200° C. | 7.0 | 7.2 | 7.1 | 7.0 | 7.0 | 7.0 | 7.0 | 7.0 | 7.0 | 7.3 |
| Thermal Linear Expansion or Contraction (%) | 0.80 | 0.80 | 0.80 | 0.80 | 0.80 | 0.80 | 0.80 | 0.80 | 0.80 | 0.80 |

| Run No. | 1-21 | 1-22 | 1-23 | 1-24 | 1-25 | 1-26 | 1-27 | 1-28 | 1-29 | 1-30 |
|---|---|---|---|---|---|---|---|---|---|---|
| Siliceous Binder | | | | | | | | | | |
| Sample No. | SSB-4 | SSB-4 | SSB-4 | SSB-4 | SSB-4 | SSB-4 | SSB-4 | SSB-4 | SSB-4 | SSB-4 |
| Amount (parts) Carbonizable Organic Binder | 6 | 6 | 6 | 6 | 6 | 6 | 6 | 6 | 6 | 6 |
| Kind | PRP | PRP | PRP | PRP | PRP | PRP | PRP | PRP | PRP | PRP |
| Amount (parts) Phosphate Type Hardening Agent | 6 | 6 | 6 | 6 | 6 | 6 | 6 | 6 | 6 | 6 |
| Sample No. | H-12 | H-13 | H-14 | H-15 | H-16 | H-17 | H-18 | H-19 | H-20 | H-21 |

TABLE 10-continued

| Amount (parts) | 4 | 4 | 4 | 6 | 5 | 5 | 6 | 6 | 6 | 5 |
|---|---|---|---|---|---|---|---|---|---|---|
| Bulk Density (g/cc) | 1.70 | 1.70 | 1.70 | 1.70 | 1.70 | 1.70 | 1.70 | 1.70 | 1.70 | 1.70 |
| Apparent Porosity (%) | 45.0 | 45.0 | 45.0 | 45.0 | 45.0 | 45.0 | 45.0 | 45.0 | 45.0 | 45.0 |
| Flexural Strength (Kg/cm$^2$) | | | | | | | | | | |
| 105° C. | 13.5 | 13.0 | 14.6 | 13.5 | 13.0 | 14.4 | 13.5 | 13.0 | 14.6 | 13.5 |
| 300° C. | 27.2 | 27.0 | 28.7 | 27.2 | 27.2 | 28.6 | 27.2 | 27.0 | 28.8 | 27.3 |
| 800° C. | 5.6 | 5.6 | 6.0 | 5.6 | 5.5 | 6.0 | 5.6 | 5.4 | 6.1 | 5.0 |
| 1200° C. | 7.2 | 7.0 | 7.8 | 7.2 | 7.0 | 7.7 | 7.2 | 7.0 | 7.9 | 6.8 |
| Thermal Linear Expansion or Contraction (%) | 0.80 | 0.80 | 0.80 | 0.80 | 0.80 | 0.80 | 0.80 | 0.80 | 0.80 | 0.80 |

| Run No. | 1-31 | 1-32 | 1-33 | 1-34 | 1-35 | 1-36 | 1-37 | 1-38 | 1-39 | 1-40 |
|---|---|---|---|---|---|---|---|---|---|---|
| Siliceous Binder | | | | | | | | | | |
| Sample No. | SSB-4 | SSB-4 | SSB-4 | SSB-4 | SSB-4 | SSB-4 | SSB-4 | SSB-4 | SSB-4 | SSB-4 |
| Amount (parts) | 6 | 6 | 6 | 6 | 6 | 6 | 6 | 6 | 6 | 6 |
| Carbonizable Organic Binder | | | | | | | | | | |
| Kind | PRP | PRP | PRP | PRP | PRP | PRP | PRP | PRP | PRP | PRP |
| Amount (parts) | 6 | 6 | 6 | 6 | 6 | 6 | 6 | 6 | 6 | 6 |
| Phosphate Type Hardening Agent | | | | | | | | | | |
| Sample No. | H-22 | H-23 | H-24 | H-25 | H-26 | H-27 | H-28 | H-29 | H-30 | H-31 |
| Amount (parts) | 5 | 5 | 4 | 4 | 4 | 3 | 4 | 3 | 6 | 4 |
| Bulk Density (g/cc) | 1.70 | 1.70 | 1.70 | 1.70 | 1.70 | 1.70 | 1.70 | 1.70 | 1.70 | 1.70 |
| Apparent Porosity (%) | 45.0 | 45.0 | 45.0 | 45.0 | 45.0 | 45.0 | 45.0 | 45.0 | 45.0 | 45.0 |
| Flexural Strength (Kg/cm$^2$) | | | | | | | | | | |
| 105° C. | 13.5 | 13.9 | 13.2 | 13.2 | 13.0 | 12.0 | 13.0 | 12.0 | 13.0 | 12.0 |
| 300° C. | 27.2 | 27.7 | 27.0 | 27.0 | 26.5 | 26.0 | 27.0 | 26.0 | 27.0 | 26.0 |
| 800° C. | 5.0 | 5.0 | 5.0 | 5.0 | 5.0 | 5.5 | 5.5 | 5.5 | 5.5 | 5.5 |
| 1200° C. | 6.8 | 6.7 | 6.5 | 6.5 | 6.4 | 7.5 | 7.5 | 7.5 | 7.5 | 7.5 |
| Thermal Linear Expansion or Contraction (%) | 0.80 | 0.80 | 0.80 | 0.80 | 0.80 | 0.80 | 0.80 | 0.80 | 0.80 | 0.80 |

| Run No. | 1-41 | 1-42 | 1-43 | 1-44 | 1-45 | 1-46 | 1-47 | 1-48 | 1-49 | 1-50 |
|---|---|---|---|---|---|---|---|---|---|---|
| Siliceous Binder | | | | | | | | | | |
| Sample No. | SSB-4 | SSB-4 | SSB-4 | SSB-4 | SSB-4 | SSB-4 | SSB-4 | SSB-4 | SSB-4 | SSB-4 |
| Amount (parts) | 6 | 6 | 6 | 6 | 6 | 6 | 6 | 6 | 6 | 6 |
| Carbonizable Organic Binder | | | | | | | | | | |
| Kind | PRP | PRP | PRP | PRP | PRP | PRP | PRP | PRP | PRP | PRP |
| Amount (parts) | 6 | 6 | 6 | 6 | 6 | 6 | 6 | 6 | 6 | 6 |
| Phosphate Type Hardening Agent | | | | | | | | | | |
| Sample No. | H-32 | H-33 | H-34 | H-35 | H-36 | H-37 | H-38 | H-39 | H-40 | H-41 |
| Amount (parts) | 6 | 3 | 6 | 2.5 | 2.5 | 3 | 2.5 | 2.5 | 2.5 | 4 |
| Bulk Density (g/cc) | 1.70 | 1.70 | 1.70 | 1.70 | 1.70 | 1.70 | 1.70 | 1.70 | 1.70 | 1.70 |
| Apparent Porosity (%) | 45.0 | 45.0 | 45.0 | 45.0 | 45.0 | 45.0 | 45.0 | 45.0 | 45.0 | 45.0 |
| Flexural Strength (Kg/cm$^2$) | | | | | | | | | | |
| 105° C. | 13.0 | 14.0 | 14.3 | 13.5 | 13.5 | 12.8 | 12.8 | 12.8 | 12.8 | 13.0 |
| 300° C. | 27.0 | 29.5 | 29.7 | 27.0 | 27.0 | 26.7 | 26.5 | 26.6 | 26.7 | 27.0 |
| 800° C. | 5.5 | 8.2 | 8.3 | 5.0 | 5.0 | 5.0 | 5.0 | 5.0 | 5.0 | 5.0 |
| 1200° C. | 7.5 | 8.5 | 8.6 | 7.0 | 7.0 | 7.0 | 7.0 | 7.0 | 7.0 | 7.2 |
| Thermal Linear Expansion or Contraction (%) | 0.80 | 0.80 | 0.80 | 0.80 | 0.80 | 0.80 | 0.80 | 0.80 | 0.80 | 0.80 |

| Run No. | 1-51 | 1-52 | 1-53 | 1-54 | 1-55 | 1-56 | 1-57 | 1-58 | 1-59 | 1-60 |
|---|---|---|---|---|---|---|---|---|---|---|
| Siliceous Binder | | | | | | | | | | |
| Sample No. | SSB-4 | SSB-4 | SSB-4 | SSB-4 | SSB-4 | SSB-4 | SSB-4 | SSB-4 | SSB-4 | SSB-4 |
| Amount (parts) | 6 | 6 | 6 | 6 | 6 | 6 | 6 | 6 | 6 | 6 |
| Carbonizable Organic Binder | | | | | | | | | | |
| Kind | PRP | PRP | PRP | PRP | PRP | PRP | PRP | PRP | PRP | PRP |
| Amount (parts) | 6 | 6 | 6 | 6 | 6 | 6 | 6 | 6 | 6 | 6 |
| Phosphate Type Hardening Agent | | | | | | | | | | |
| Sample No. | H-42 | H-43 | H-44 | H-45 | H-46 | H-47 | H-48 | H-49 | H-50 | H-51 |
| Amount (parts) | 3 | 2 | 2.5 | 3 | 4 | 6 | 7 | 2 | 3 | 4 |
| Bulk Density (g/cc) | 1.70 | 1.70 | 1.70 | 1.70 | 1.70 | 1.70 | 1.70 | 1.70 | 1.70 | 1.70 |
| Apparent Porosity (%) | 45.0 | 45.0 | 45.0 | 45.0 | 45.0 | 45.0 | 45.0 | 45.0 | 45.0 | 45.0 |
| Flexural Strength (Kg/cm$^2$) | | | | | | | | | | |
| 105° C. | 12.5 | 11.9 | 12.0 | 12.0 | 12.2 | 12.0 | 12.0 | 11.5 | 11.2 | 11.3 |
| 300° C. | 25.8 | 22.5 | 23.0 | 22.8 | 22.9 | 22.8 | 23.0 | 21.0 | 21.0 | 23.0 |

TABLE 10-continued

| | | | | | | | | | | |
|---|---|---|---|---|---|---|---|---|---|---|
| 800° C. | 4.2 | 4.2 | 4.4 | 4.4 | 4.5 | 4.4 | 4.5 | 4.1 | 4.1 | 4.2 |
| 1200° C. | 6.6 | 6.8 | 6.6 | 6.6 | 6.8 | 6.7 | 6.8 | 6.2 | 6.3 | 6.3 |
| Thermal Linear Expansion or Contraction (%) | 0.80 | 0.80 | 0.80 | 0.80 | 0.80 | 0.80 | 0.80 | 0.80 | 0.80 | 0.80 |
| Run No. | 1-61 | 1-62 | 1-63 | 1-64 | 1-65 | 1-66 | 1-67 | 1-68 | 1-69 | 1-70 |
| Siliceous Binder | | | | | | | | | | |
| Sample No. | SSB-4 | SSB-4 | SSB-4 | SSB-4 | SSB-4 | SSB-4 | SSB-4 | SSB-4 | SSB-4 | SSB-4 |
| Amount (parts) | 6 | 6 | 6 | 6 | 6 | 6 | 6 | 6 | 6 | 6 |
| Carbonizable Organic Binder | | | | | | | | | | |
| Kind | PRP | PRP | PRP | PRP | PRP | PRP | PRP | PRP | PRP | PRP |
| Amount (parts) | 6 | 6 | 6 | 6 | 6 | 6 | 6 | 6 | 6 | 6 |
| Phosphate Type Hardening Agent | | | | | | | | | | |
| Sample No. | H-52 | H-53 | H-54 | H-55 | H-56 | H-57 | H-58 | H-59 | H-60 | H-61 |
| Amount (parts) | 2.5 | 2 | 5 | 6 | 6 | 7 | 6 | 6 | 3 | 2.5 |
| Bulk Density (g/cc) | 1.70 | 1.70 | 1.70 | 1.70 | 1.70 | 1.70 | 1.70 | 1.70 | 1.70 | 1.70 |
| Apparent Porosity (%) | 45.0 | 45.0 | 45.0 | 45.0 | 45.0 | 45.0 | 45.0 | 45.0 | 45.0 | 45.0 |
| Flexural Strength (Kg/cm$^2$) | | | | | | | | | | |
| 105° C. | 11.8 | 11.7 | 13.0 | 13.0 | 13.0 | 13.0 | 13.0 | 13.0 | 11.8 | 12.0 |
| 300° C. | 22.9 | 22.7 | 27.0 | 27.0 | 27.0 | 27.0 | 27.0 | 27.0 | 25.0 | 24.0 |
| 800° C. | 4.5 | 4.4 | 5.0 | 5.0 | 5.0 | 5.0 | 5.0 | 5.0 | 4.2 | 4.4 |
| 1200° C. | 6.6 | 6.5 | 7.0 | 7.0 | 7.0 | 7.0 | 7.0 | 7.0 | 6.6 | 6.7 |
| Thermal Linear Expansion or Contraction (%) | 0.80 | 0.80 | 0.80 | 0.80 | 0.80 | 0.80 | 0.80 | 0.80 | 0.80 | 0.80 |
| Run No. | 1-71 | 1-72 | 1-73 | 1-74 | 1-75 | 1-76 | 1-77 | 1-78 | 1-79 | 1-80 |
| Siliceous Binder | | | | | | | | | | |
| Sample No. | SSB-4 | SSB-4 | SSB-4 | SSB-4 | SSB-4 | SSB-4 | SSB-4 | SSB-4 | SSB-4 | SSB-4 |
| Amount (parts) | 6 | 6 | 6 | 6 | 6 | 6 | 6 | 6 | 6 | 6 |
| Carbonizable Organic Binder | | | | | | | | | | |
| Kind | PRP | PRP | PRP | PRP | PRP | PRP | PRP | PRP | PRP | PRP |
| Amount (parts) | 6 | 6 | 6 | 6 | 6 | 6 | 6 | 6 | 6 | 6 |
| Phosphate Type Hardening Agent | | | | | | | | | | |
| Sample No. | H-62 | H-63 | H-64 | H-65 | H-66 | H-67 | H-68 | H-69 | H-70 | H-71 |
| Amount (parts) | 2 | 4 | 4 | 6 | 6 | 6 | 6.5 | 7 | 6 | 6 |
| Bulk Density (g/cc) | 1.70 | 1.70 | 1.70 | 1.70 | 1.70 | 1.70 | 1.70 | 1.70 | 1.70 | 1.70 |
| Apparent Porosity (%) | 45.0 | 45.0 | 45.0 | 45.0 | 45.0 | 45.0 | 45.0 | 45.0 | 45.0 | 45.0 |
| Flexural Strength (Kg/cm$^2$) | | | | | | | | | | |
| 105° C. | 12.2 | 13.0 | 12.7 | 13.0 | 13.0 | 13.2 | 13.2 | 13.5 | 13.5 | 13.5 |
| 300° C. | 24.0 | 24.5 | 23.8 | 27.0 | 26.5 | 27.0 | 27.0 | 27.8 | 27.5 | 27.5 |
| 800° C. | 4.4 | 4.8 | 4.6 | 5.5 | 5.4 | 5.5 | 5.5 | 5.9 | 5.5 | 5.5 |
| 1200° C. | 6.7 | 6.8 | 6.7 | 7.5 | 7.2 | 7.0 | 7.2 | 7.9 | 7.3 | 7.3 |
| Thermal Linear Expansion or Contraction (%) | 0.80 | 0.80 | 0.80 | 0.80 | 0.80 | 0.80 | 0.80 | 0.80 | 0.80 | 0.80 |
| Run No. | 1-81 | 1-82 | 1-83 | 1-84 | 1-85 | 1-86 | 1-87 | 1-88 | 1-89 | 1-90 |
| Siliceous Binder | | | | | | | | | | |
| Sample No. | SSB-4 | SSB-4 | SSB-4 | SSB-4 | SSB-4 | SSB-4 | SSB-4 | SSB-4 | SSB-4 | SSB-4 |
| Amount (parts) | 6 | 6 | 6 | 6 | 6 | 6 | 6 | 6 | 6 | 6 |
| Carbonizable Organic Binder | | | | | | | | | | |
| Kind | PRP | PRP | PRP | PRP | PRP | PRP | PRP | PRP | PRP | PRP |
| Amount (parts) | 6 | 6 | 6 | 6 | 6 | 6 | 6 | 6 | 6 | 6 |
| Phosphate Type Hardening Agent | | | | | | | | | | |
| Sample No. | H-72 | H-73 | H-74 | H-75 | H-76 | H-77 | H-78 | H-79 | H-80 | H-81 |
| Amount (parts) | 6 | 1.6 | 1.6 | 1.6 | 2 | 2 | 2 | 3 | 2.5 | 2.5 |
| Bulk Density (g/cc) | 1.70 | 1.70 | 1.70 | 1.70 | 1.70 | 1.70 | 1.70 | 1.70 | 1.70 | 1.70 |
| Apparent Porosity (%) | 45.0 | 45.0 | 45.0 | 45.0 | 45.0 | 45.0 | 45.0 | 45.0 | 45.0 | 45.0 |
| Flexural Strength (Kg/cm$^2$) | | | | | | | | | | |
| 105° C. | 13.5 | 11.2 | 11.1 | 11.2 | 11.8 | 11.8 | 12.0 | 12.0 | 12.0 | 12.0 |
| 300° C. | 27.5 | 20.5 | 21.0 | 21.0 | 22.0 | 22.0 | 22.5 | 22.5 | 22.5 | 22.0 |
| 800° C. | 5.5 | 4.2 | 4.2 | 4.3 | 4.4 | 4.5 | 4.5 | 4.5 | 4.5 | 4.2 |
| 1200° C. | 7.3 | 6.1 | 6.1 | 6.1 | 6.4 | 6.5 | 6.5 | 6.5 | 6.5 | 6.3 |
| Thermal Linear Expansion or Contraction (%) | 0.80 | 0.80 | 0.80 | 0.80 | 0.80 | 0.80 | 0.80 | 0.80 | 0.80 | 0.80 |
| Run No. | 1-91 | 1-92 | 1-93 | 1-94 | 1-95 | 1-96 | 1-97 | 1-98 | 1-99 | 1-100 |

TABLE 10-continued

| Siliceous Binder | | | | | | | | | | |
|---|---|---|---|---|---|---|---|---|---|---|
| Sample No. | SSB-4 | SSB-4 | SSB-4 | SSB-4 | SSB-4 | SSB-4 | SSB-4 | SSB-4 | SSB-4 | SSB-4 |
| Amount (parts) | 6 | 6 | 6 | 6 | 6 | 6 | 6 | 6 | 6 | 6 |
| Carbonizable Organic Binder | | | | | | | | | | |
| Kind | PRP | PRP | PRP | PRP | PRP | PRP | PRP | PRP | PRP | PRP |
| Amount (parts) | 6 | 6 | 6 | 6 | 6 | 6 | 6 | 6 | 6 | 6 |
| Phosphate Type Hardening Agent | | | | | | | | | | |
| Sample No. | H-82 | H-83 | H-84 | H-85 | H-86 | H-87 | H-88 | H-89 | H-90 | H-91 |
| Amount (parts) | 5 | 5 | 4 | 7 | 7 | 6 | 6.5 | 6 | 7 | 9 |
| Bulk Density (g/cc) | 1.70 | 1.70 | 1.70 | 1.70 | 1.70 | 1.70 | 1.70 | 1.70 | 1.70 | 1.70 |
| Apparent porosity (%) | 45.0 | 45.0 | 45.0 | 45.0 | 45.0 | 45.0 | 45.0 | 45.0 | 45.0 | 45.0 |
| Flexural Strength (Kg/cm$^2$) | | | | | | | | | | |
| 105° C. | 13.5 | 13.5 | 13.5 | 14.5 | 14.5 | 14.5 | 13.0 | 13.0 | 11.2 | 12.0 |
| 300° C. | 27.5 | 27.5 | 27.5 | 28.5 | 28.5 | 28.5 | 27.0 | 27.0 | 21.0 | 22.0 |
| 800° C. | 6.0 | 6.0 | 6.0 | 6.0 | 6.0 | 6.0 | 5.5 | 5.5 | 4.5 | 4.8 |
| 1200° C. | 7.5 | 7.5 | 7.5 | 7.5 | 7.5 | 7.5 | 7.0 | 7.0 | 6.4 | 6.5 |
| Thermal Linear Expansion or Contraction (%) | 0.80 | 0.80 | 0.80 | 0.80 | 0.80 | 0.80 | 0.80 | 0.80 | 0.80 | 0.80 |

| Run No. | 1-101 | 1-102 | 1-103 | 1-104 | 1-105 | 1-106 | 1-107 | 1-108 | 1-109 | 1-110 |
|---|---|---|---|---|---|---|---|---|---|---|
| Siliceous Binder | | | | | | | | | | |
| Sample No. | SSB-4 | SSB-4 | SSB-4 | SSB-4 | SSB-4 | SSB-4 | SSB-4 | SSB-4 | SSB-4 | SSB-4 |
| Amount (parts) | 6 | 6 | 6 | 6 | 6 | 6 | 6 | 6 | 6 | 6 |
| Carbonizable Organic Binder | | | | | | | | | | |
| Kind | PRP | PRP | PRP | PRP | PRP | PRP | PRP | PRP | PRP | PRP |
| Amount (parts) | 6 | 6 | 6 | 6 | 6 | 6 | 6 | 6 | 6 | 6 |
| Phosphate Type Hardening Agent | | | | | | | | | | |
| Sample No. | H-92 | H-93 | H-94 | H-95 | H-96 | H-97 | H-98 | H-99 | H-100 | H-101 |
| Amount (parts) | 9 | 2 | 2 | 3 | 6 | 3 | 2 | 1.5 | 4 | 2 |
| Bulk Density (g/cc) | 1.70 | 1.70 | 1.70 | 1.70 | 1.70 | 1.70 | 1.70 | 1.70 | 1.70 | 1.70 |
| Apparent Porosity (%) | 45.0 | 45.0 | 45.0 | 45.0 | 45.0 | 45.0 | 45.0 | 45.0 | 45.0 | 45.0 |
| Flexural Strength (Kg/cm$^2$) | | | | | | | | | | |
| 105° C. | 11.5 | 11.2 | 11.2 | 11.5 | 11.3 | 11.4 | 11.5 | 11.3 | 11.3 | 11.2 |
| 300° C. | 22.5 | 21.5 | 21.8 | 21.5 | 22.0 | 21.7 | 21.8 | 21.5 | 21.6 | 21.7 |
| 800° C. | 4.7 | 4.3 | 4.2 | 4.3 | 4.2 | 4.2 | 4.2 | 4.2 | 4.2 | 4.2 |
| 1200° C. | 6.2 | 6.2 | 6.2 | 6.3 | 6.3 | 6.3 | 6.3 | 6.3 | 6.3 | 6.2 |
| Thermal Linear Expansion or Contraction (%) | 0.80 | 0.80 | 0.80 | 0.80 | 0.80 | 0.80 | 0.80 | 0.80 | 0.80 | 0.80 |

| Run No. | 1-111 | 1-112 | 1-113 | 1-114 | 1-115 | 1-116 | 1-117 | 1-118 | 1-119 | 1-120 |
|---|---|---|---|---|---|---|---|---|---|---|
| Siliceous Binder | | | | | | | | | | |
| Sample No. | SSB-4 | SSB-4 | SSB-4 | SSB-4 | SSB-4 | SSB-15 | SSB-1 | SSB-2 | SSB-3 | SSB-5 |
| Amount (parts) | 6 | 6 | 6 | 6 | 6 | 7 | 6 | 6 | 6 | 6 |
| Carbonizable Organic Binder | | | | | | | | | | |
| Kind | PRP | PRP | PRP | PRP | PRP | PRP | PRP | PRP | PRP | PRP |
| Amount (parts) | 6 | 6 | 6 | 6 | 6 | 7 | 6 | 6 | 6 | 6 |
| Phosphate Type Hardening Agent | | | | | | | | | | |
| Sample No. | H-102 | H-103 | H-104 | H-105 | H-106 | H-3 | H-3 | H-3 | H-3 | H-3 |
| Amount (parts) | 4 | 6 | 6 | 6 | 6 | 3.5 | 3 | 3 | 3 | 3 |
| Bulk Density (g/cc) | 1.70 | 1.70 | 1.70 | 1.70 | 1.70 | 1.70 | 1.70 | 1.70 | 1.70 | 1.70 |
| Apparent Porosity (%) | 45.0 | 45.0 | 45.0 | 45.0 | 45.0 | 45.0 | 45.0 | 45.0 | 45.0 | 45.0 |
| Flexural Strength (Kg/cm$^2$) | | | | | | | | | | |
| 105° C. | 11.9 | 12.5 | 12.5 | 12.5 | 13.0 | 14.0 | 13.5 | 13.5 | 13.5 | 13.5 |
| 300° C. | 25.0 | 23.0 | 23.0 | 23.5 | 26.5 | 30.0 | 27.5 | 27.5 | 27.5 | 27.5 |
| 800° C. | 5.0 | 5.0 | 5.0 | 5.2 | 5.5 | 6.0 | 5.5 | 5.5 | 5.5 | 5.5 |
| 1200° C. | 7.0 | 6.5 | 6.5 | 6.7 | 7.3 | 8.0 | 7.5 | 7.5 | 7.5 | 6.5 |
| Thermal Linear Expansion or Contraction (%) | 0.80 | 0.80 | 0.80 | 0.80 | 0.80 | 0.80 | 0.80 | 0.80 | 0.80 | 0.80 |

| Run No. | 1-121 | 1-122 | 1-123 | 1-124 | 1-125 | 1-126 | 1-127 | 1-128 | 1-129 | 1-130 |
|---|---|---|---|---|---|---|---|---|---|---|
| Siliceous Binder | | | | | | | | | | |
| Sample No. | SSB-6 | SSB-7 | SSB-8 | SSB-9 | SSB-10 | SSB-11 | SSB-12 | SSB-13 | SSB-14 | SSB-15 |
| Amount (parts) | 5 | 7 | 6 | 6 | 6 | 6 | 6 | 6 | 6 | 6 |
| Carbonizable Organic Binder | | | | | | | | | | |
| Kind | PRP | PRP | PRP | PRP | PRP | PRP | PRP | PRP | PRP | PRP |
| Amount (parts) | 5 | 6 | 6 | 6 | 6 | 6 | 6 | 6 | 6 | 6 |

TABLE 10-continued

| Phosphate Type Hardening Agent | | | | | | | | | | |
|---|---|---|---|---|---|---|---|---|---|---|
| Sample No. | H-3 | H-3 | H-3 | H-3 | H-3 | H-3 | H-3 | H-1 | H-1 | H-3 |
| Amount (parts) | 2.5 | 3.5 | 3 | 3 | 3 | 3 | 3 | 4 | 4 | 2.5 |
| Bulk Density (g/cc) | 1.70 | 1.70 | 1.70 | 1.70 | 1.70 | 1.70 | 1.70 | 1.70 | 1.70 | 1.70 |
| Apparent Porosity (%) | 45.0 | 45.0 | 45.0 | 45.0 | 45.0 | 45.0 | 45.0 | 45.0 | 45.0 | 45.0 |
| Flexural Strength (Kg/cm$^2$) | | | | | | | | | | |
| 105° C. | 13.5 | 11.8 | 13.0 | 14.5 | 13.0 | 13.0 | 13.0 | 11.8 | 11.7 | 14.0 |
| 300° C. | 27.5 | 23.8 | 27.5 | 28.5 | 27.5 | 27.5 | 27.5 | 23.5 | 22.5 | 30.0 |
| 800° C. | 5.5 | 4.5 | 5.5 | 6.0 | 5.5 | 5.5 | 5.5 | 4.7 | 4.5 | 6.0 |
| 1200° C. | 6.5 | 6.4 | 6.5 | 8.2 | 6.5 | 6.5 | 6.5 | 6.5 | 6.3 | 8.0 |
| Thermal Linear Expansion or Contraction (%) | 0.80 | 0.80 | 0.80 | 0.80 | 0.80 | 0.80 | 0.80 | 0.80 | 0.80 | 0.80 |

| Run No. | 1-131 | 1-132 | 1-133 | 1-134 | 1-135 | 1-136 | 1-137 | 1-138 | 1-139 | 1-140 | 1-141 | 1-142 |
|---|---|---|---|---|---|---|---|---|---|---|---|---|
| Siliceous Binder | | | | | | | | | | | | |
| Sample No. | SSB-16 | SSB-17 | SSB-18 | SSB-19 | SSB-4 | SSB-4 | SSB-4 | SSB-4 | SSB-4 | SSB-4 | SSB-4 | SSB-15 |
| Amount (parts) | 6 | 6 | 6 | 6 | 6 | 6 | 6 | 6 | 6 | 6 | 6 | 6 |
| Carbonizable Organic Binder | | | | | | | | | | | | |
| Kind | PRP | PRP | PRP | PRP | tar and pitch | Tar | epoxy resin | CMC | lignin | sodium alginate | PRP | PRP |
| Amount (parts) | 6 | 6 | 6 | 6 | 3 + 3 | 6 | 6 | 2 | 2 | 3 | 6 | 6 |
| Phosphate Type Hardening Agent | | | | | | | | | | | | |
| Sample No. | H-3 | H-3 | H-3 | H-3 | H-3 | H-3 | H-3 | H-3 | H-3 | H-3 | H-107 | H-107 |
| Amount (parts) | 2.5 | 2.5 | 3 | 3 | 3 | 3 | 3 | 3 | 3 | 3 | 11.5 | 11.5 |
| Bulk Density (g/cc) | 1.70 | 1.70 | 1.70 | 1.70 | 1.70 | 1.70 | 1.70 | 1.70 | 1.70 | 1.70 | 1.70 | 1.70 |
| Apparent Porosity (%) | 45.0 | 45.0 | 45.0 | 45.0 | 45.0 | 45.0 | 45.0 | 45.0 | 45.0 | 45.0 | 45.0 | 45.0 |
| Flexural Strength (Kg/cm$^2$) | | | | | | | | | | | | |
| 105° C. | 13.8 | 13.8 | 13.0 | 13.5 | 12.0 | 12.0 | 13.5 | 12.0 | 12.0 | 12.0 | 13.0 | 13.5 |
| 300° C. | 29.0 | 29.0 | 26.5 | 27.0 | 22.5 | 22.5 | 26.5 | 22.6 | 22.2 | 22.3 | 27.0 | 27.8 |
| 800° C. | 5.8 | 6.0 | 5.5 | 5.5 | 4.8 | 4.7 | 5.5 | 4.6 | 4.4 | 4.5 | 5.5 | 6.0 |
| 1200° C. | 7.9 | 7.9 | 7.0 | 7.2 | 6.7 | 6.5 | 7.3 | 6.3 | 6.2 | 6.5 | 7.5 | 7.8 |
| Thermal Linear Expansion or Contraction (%) | 0.80 | 0.80 | 0.80 | 0.80 | 0.80 | 0.80 | 0.08 | 0.80 | 0.80 | 0.80 | 0.80 | 0.80 |

From the results shown in Table 10, it is seen that unfired compositions obtained by molding a mixture of a magnesia type tundish board aggregate and a binder according to the present invention are satisfactory in the physical properties required for the tundish refractory, such as the bulk density, apparent porosity, thermal expansion or contraction and flexural strength and that the flexural strength at 105°, 300°, 800° and 1200° C. was much higher than those of the composition in which the binder was not incorporated (though a 5% solution of CMC was added to maintain the moldability) (C-11), the composition in which any one of the tree indispensable components, that is, the siliceous binder, carbonizable organic binder and phosphate type hardening agent, was not incorporated and the composition in which the three components were incorporated in amounts not satisfying the requirement of the present invention. More specifically, in case of these comparative compositions, the flexural strength was as low as 11, 20, 4 or 6 at 105°, 300°, 800° or 1200° C. or the thermal linear expansion or contraction was large and beyond 1.2%. Accordingly, it is apparent that these comparative compositions cannot be used as the tundish refractory.

On the other hand, when the siliceous binder, organic binder and phosphate type hardening agent were incorporated in amounts satisfying the requirement of the present invention, an appropriate flexural strength was obtained at each of the above-mentioned temperature and the thermal linear expansion or contraction was very small. Accordingly, it will readily be understood that the compositions of the present invention can effectively be used as the tundish refractory.

When commercially available water glass, i.e., sodium silicate, was used as the siliceous binder no good results were obtained. Furthermore, it is seen that a siliceous binder having a good fluidity stability even after dehydration with methanol provides good results and when a hardly soluble phosphate type hardening agent or a hardening agent capable of gradually releasing the phosphoric acid component is used as the hardening agent for such siliceous binder, good results are obtained, and that when a carbonizable binder is used in combination with such siliceous binder and phosphate type hardening agent, there is obtained a very low value of the thermal linear expansion or contraction, which is apparent from comparison of the results of the present invention with data of C-15 (comparison). It also is seen that in case of the composition of the present invention, even if it is exposed in a hot atmosphere maintained at about 800° C., oxidation of the carbide is prevented by the effect of the phosphate type hardening agent and a refractory having a high stability can be obtained. Therefore, the composition of the present invention can effectively be used as a high temperature refractory and it retains a high flexural strength under a drying temperature condition of 105° C. Accordingly, energy for the manufacture of refractory materials can remarkably be saved. Also in this point, the present invention is advantageous over the conventional methods in which a large quantity of energy, such as petroleum, is inevitably used. Moreover, the composition of the present invention can also be used as a refractory of an undefinite shape, and when the composition of the present invention is used as a refractory of an undefinite shape, dusts are hardly formed on disassembling of the refractory material structure, and the problem of the environmental pollution can be solved effectively.

EXAMPLE 2

An unfired refractory material having a composition for magnesia carbon bricks (hereinafter referred to as "MC") will described in this Example.

The aggregate composition of MC is as follows.

| | |
|---|---|
| Sea water magnesia clinker (1 to 5 mm in size) | 55 parts |
| Sea water magnesia clinker (less than 0.074 mm in size) | 27 parts |
| Natural scaly graphite (less than 0.074 mm in size) | 12 parts |
| Soil-like graphite (less than 0.044 mm in size) | 6 parts |
| Total | 100 parts |

Sea water clinker having an MgO component content of at least 95% and the scaly and soil-like graphites having a fixed carbon content of at least 88% were chosen and used. The respective ingredients were mixed in a small mixer to form a homogeneous MC aggregate composition. The so obtained MC aggregate composition was analyzed to obtain results shown below.

| | |
|---|---|
| MgO | 79.0% |
| $Al_2O_3$ | 1.8% |
| $SiO_2$ | 2.4% |
| CaO | 0.3% |
| C | 16.5% |

A binder shown in Table 11 was incorporated in an amount shown in Table 11 into 100 parts of this MC aggregate. More specifically, sea water clinkers (both the coarse and fine clinkers) were charged in a wet pan mill, and a predetermined amount of the binder was incorporated in the MC aggregate and the mixture was sufficiently stirred to obtain a homogeneous wet composition. The remaining aggregate component (graphite) was added to the composition and the mixture was stirred and rolled to obtain a homogeneous green composition of the MC aggregate.

The green composition was filled in a mold having an area of 230 mm × 114 mm and compression-molded under a pressure of 1000 Kg/cm² to form an angular column having a size of 230 mm × 114 mm × 65 mm. The column was allowed to stand in a heating atmosphere maintained at 105° C. The so obtained test piece was tested with respect to the items shown in Table 11 to show whether or not it could be used as an unfired refractory.

The obtained results are shown in Table 11.

In comparative runs, no binder was used but 6 parts of a 5% solution of CMC was added so as to maintain the moldability (C-21), commercially available water glass (SS-1) was used as the binder (C-22), and only the siliceous binder and the phosphate type hardening agent were added (C-23), and these comparative compositions were molded into test pieces and tested in the same manner as described above. The obtained results are shown in Table 11.

TABLE 11

| Run No. | C-21 (comparison) | C-22 (comparison) | C-23 (comparison) | 2-1 | 2-2 | 2-3 | 2-4 | 2-5 |
|---|---|---|---|---|---|---|---|---|
| Siliceous Binder | | | | | | | | |
| Sample No. | — | SS-1 | SSB-4 | SSB-4 | SSB-15 | SSB-4 | SSB-4 | SSB-15 |
| Amount (parts) | 0 | 6 | 6 | 6 | 6 | 9 | 4 | 4 |
| Carbonizable Organic Binder | | | | | | | | |
| Kind | — | PRP | — | PRP | PRP | PRP | PRP | tar |
| Amount (parts) | 0 | 6 | 0 | 6 | 6 | 6 | 6 | 6 |
| Phosphate Type Hardening Agent | | | | | | | | |
| Sample No. | — | H-3 | H-3 | H-3 | H-3 | H-3 | H-3 | H-3 |
| Amount (parts) | 0 | 3 | 3 | 3 | 3 | 4.5 | 2 | 2 |
| Bulk Density (g/cc) | 2.75 | 2.75 | 2.75 | 2.75 | 2.75 | 2.75 | 2.75 | 2.75 |
| Apparent Porosity (%) | 6.8 | 3.4 | 4.2 | 2.8 | 2.8 | 2.8 | 2.8 | 2.8 |
| Flexural Strength (Kg/cm²) (at 1450° C.) | 0 | 21 | 24 | 42 | 44 | 38 | 41 | 35 |
| Thermal Linear Expansion or Contraction (at 1000° C.) (%) | 0.31 | 0.26 | 0.28 | 0.23 | 0.23 | 0.23 | 0.23 | 0.23 |
| Compression Strength (Kg/cm²) | | | | | | | | |
| 105° C. | 80 | 385 | 410 | 580 | 585 | 570 | 480 | 460 |
| 300° C. | 80 | 428 | 470 | 650 | 660 | 640 | 570 | 530 |
| 800° C. | 0 | 171 | 75 | 352 | 360 | 348 | 240 | 220 |
| 1200° C. | 0 | 74 | 43 | 128 | 130 | 125 | 100 | 100 |

From the results shown in Table 11, it will readily be understood that an unfired molded article obtained by adding the binder of the present invention to the magnesia carbon brick aggregate and molding the composition can satisfactorily be used as an unfired refractory. That is, the apparent porosity was lower than 3.0%, the hot flexural strength (1450° C.) was higher than 30 Kg/cm², the thermal linear expansion or contraction (1000° C.) was less than 0.25 and the compression strength was higher than 450, 500, 200 and 90 Kg/cm² at 105°, 300°, 800° and 1200° C., respectively. Since the refractory obtained according to the present invention has an apparent porosity lower than 3.0%, it is seen that the product is very suitable as a refractory for an electric furnace.

EXAMPLE 3

An unfired refractory having a composition for alumina carbon bricks (hereinafter referred to as "AC") is described in this Example.

The AC aggregate composition is as follows:

| | |
|---|---|
| Sintered alumina coarse particles (1 to | 40 parts |

| | |
|---|---|
| 3 mm in size) | |
| Sintered alumina powder (less than 0.074 mm in size) | 28 parts |
| Natural scaly graphite (less than 0.074 mm in size) | 32 parts |
| Total | 100 parts |

A binder shown in Table 12 was added in an amount shown in Table 12 to 100 parts of the AC aggregate in a wet pan mill. Water was added in an amount of 55 parts, and the mixture was stirred to obtain a homogeneous green composition of the AC aggregate. Then, the composition was filled in a mold having an area of 230 mm × 114 mm and compression-molded under a pressure of 1000 Kg/cm² to form an angular column having a size of 230 mm × 114 mm × 65 mm. The column was allowed to stand in a heating atmosphere maintained at 105° C. for 5 hours to obtain a test piece.

The physical properties shown in Table 12 were determined, and the oxidation resistance and corrosion resistance were tested according to the following methods to evaluate whether or not the product could be used as an unfired refractory of alumina carbon bricks.

Oxidation Resistance

Two test pieces having a size of 50 mm × 50 mm × 50 mm were cut out from the molded article while one molded surface was left on each cut piece.

One test piece was used for measurement of the compression strength (SO) by an Amsler compression strength tester.

The remaining test piece was weighed to record the weight (WO), and it was then put into an oxidative atmosphere furnace maintained at 1000° C. and was kept in this furnace for 2 hours. The test piece was taken out and naturally cooled. The weight (Wl) of the test piece was measured, and the test piece was broken under application of a compressive force by using an Amsler compression strength tester to determine the compression strength (Sl). The oxidation weight change ratio (RW) and oxidation compression strength change ratio (RS) were calculated according to the following formulae:

$$\text{Oxidation weight change ratio } (RW, \%) = \frac{W0 - W1}{W0} \times 100$$

$$\text{Oxidation compression strength change ratio } (RS, \%) = \frac{S0 - S1}{S0} \times 100$$

Corrosion Resistance

Test pieces having a size of 20 mm × 20 mm × 150 mm were cut out from the molded article.

Slag powder (CaO/SiO$_2$ ratio = 1.8 − 2.5) formed in a steel-manufacturing furnace was filled in a graphite crucible, and the slag was kept molten by elevating the temperature above 1450° C. in a propane gas combustion furnace.

Then, 3 to 5 test pieces attached at certain intervals to a disc-like supporting member were immersed in the molten slag, and under rotation at 3 rpm, the test pieces were kept in the molten slag for 10 minutes. Then, the test pieces were taken out from the slag and naturally cooled. Each test piece was cut in the traverse direction at the center of the immersed portion, and the sizes of the original test piece portions were measured and the sectional area change ratio (%) was calculated.

In comparative runs, the binder was not used (C-31), commercially available water glass (SS-1) was used as the binder (C-32) and siliceous binder and phosphate type hardening agent alone were added (C-33).

Furthermore, tar and pitch or tar, pitch and the phosphate type hardening agent were added to the AC aggregate instead of the binder and the composition was calcined in a reducing atmosphere at about 1300° C. for 72 hours. Thus, graphite alumina refractory test pieces (C-34 and C-35) were prepared.

These comparative test pieces were similarly tested. The obtained results are shown in Table 12.

TABLE 12

| Run No. | C-31 (comparison) | C-32 (comparison) | C-33 (comparison) | C-34 (comparison) | C-35 (comparison) | 3-1 |
|---|---|---|---|---|---|---|
| Siliceous Binder | | | | | | |
| Sample No. | — | SS-1 | SSB-4 | — | — | SSB-4 |
| Amount (parts) | 0 | 6 | 6 | 0 | 0 | 0 |
| Carbonizable Organic Binder | | | | | | |
| Kind | — | PRP | — | tar and pitch | tar and pitch | PRP |
| Amount (parts) | 0 | 6 | 0 | 10 | 10 | 6 |
| Phosphate Type Hardening Agent | | | | | | |
| Sample No. | — | H-3 | H-3 | — | H-3 | H-3 |
| Amount (parts) | 0 | 3 | 3 | 0 | 3 | 3 |
| Bulk Density (g/cc) | 2.15 | 2.15 | 2.15 | 2.10 | 2.10 | 2.15 |
| Apparent Porosity (%) | 23.7 | 18.5 | 18.4 | 20.5 | 20.0 | 19.3 |
| Thermal Flexural Strength (Kg/cm²) (at 1450° C.) | 0 | 41.7 | 37.6 | 40.4 | 41.5 | 72.3 |
| Thermal Linear Expansion or Contraction (%) (at 1000° C.) | 0.33 | 0.27 | 0.27 | 0.28 | 0.30 | 0.24 |
| Compression Strength (Kg/cm²) | | | | | | |
| 105° C. | 140 | 175 | 192 | 255 | 275 | 225 |
| 300° C. | 140 | 230 | 280 | 255 | 275 | 320 |
| 800° C. | 0 | 70 | 85 | 98 | 108 | 128 |
| 1200° C. | 0 | 24 | 31 | 58 | 53 | 107 |
| Oxidation Resistance (%) | | | | | | |
| Weight Change Ratio | 25.4 | 22.6 | 23.8 | 27.3 | 27.2 | 19.4 |
| Compression Strength Change Ratio | | 62.9 | 72.4 | 100.0 | 100.0 | 48.9 |
| Corrosion Resistance (%) | — | 25.7 | 28.9 | 25.1 | 25.1 | 16.3 |

TABLE 12-continued

| Run No. | 3-2 | 3-3 | 3-4 | 3-5 | 3-6 |
|---|---|---|---|---|---|
| Siliceous Binder | | | | | |
| Sample No. | SSB-4 | SSB-4 | SSB-4 | SSB-4 | SSB-4 |
| Amount (parts) | 6 | 8 | 10 | 6 | 6 |
| Carbonizable Organic Binder | | | | | |
| Kind | tar and pitch | PRP | PRP | PRP | PRP |
| Amount (parts) | 6 | 6 | 6 | 6 | 10 |
| Phosphate Type Hardening Agent | | | | | |
| Sample No. | H-3 | H-3 | H-3 | H-3 | H-3 |
| Amount (parts) | 3 | 3 | 3 | 6 | 5 |
| Bulk Density (g/cc) | 2.15 | 2.15 | 2.15 | 2.15 | 2.15 |
| Apparent Porosity (%) | 19.5 | 19.7 | 19.7 | 18.9 | 19.6 |
| Thermal Flexural Strength ($Kg/cm^2$) (at 1450° C.) | 48.3 | 63.8 | 46.2 | 67.5 | 55.6 |
| | 48.3 | 63.8 | 46.2 | 67.5 | 55.6 |
| Thermal Linear Expansion or Contraction (%) (at 1000° C.) | 0.22 | 0.24 | 0.24 | 0.26 | 0.24 |
| Compression Strength ($Kg/cm^2$) | | | | | |
| 105° C. | 198 | 240 | 240 | 220 | 223 |
| 300° C. | 220 | 430 | 470 | 370 | 430 |
| 800° C. | 83 | 105 | 115 | 121 | 95 |
| 1200° C. | 61 | 75 | 98 | 88 | 72 |
| Oxidation Resistance (%) | | | | | |
| Weight Change Ratio | 21.8 | 20.4 | 21.3 | 19.9 | 19.6 |
| Compression Strength Change Ratio | 60.1 | 60.4 | 55.7 | 54.5 | 58.7 |
| Corrosion Resistance (%) | 18.4 | 19.7 | 23.1 | 17.9 | 18.5 |

From the results shown in Table 12, it will readily be understood that when the binder of the present invention is added to an aggregate of alumina carbon bricks and molded into an unfired refractory, the resulting molded article can satisfactorily be used as an unfired refractory and is excellent over a fired graphite alumina refractory prepared by using the same AC aggregate in various properties. More specifically, in the refractory according to the present invention, the apparent porosity is lower than 20%, the hot flexural strength (1450° C.) is higher than 45 $Kg/cm^2$, the hot linear expansion or contraction (1000° C.) is smaller than 0.26%, the compression strength is higher than 190, 220, 80 and 60 $g/cm^2$ at 105°, 300°, 800° and 1200° C., respectively, the oxidation weight change ratio (RW) is lower than 22%, the oxidation compression strength change ratio (RS) is lower than 62%, and the corrosion resistance value is smaller than 23%. Thus, it will be understood that the composition of the present is effectively used as a refractory material for a laddle, a tundish board and the like.

EXAMPLE 4

A unfired refractory material having a composition magnesia dolomite bricks (hereinafter referred to as "MD") is described in this Example.

The MD aggregate composition is as follows:

| | |
|---|---|
| Magnesia dolomite clinker (5 to 10 mm in size) | 44 parts |
| Magnesia dolomite clinker (1 to 3 mm in size) | 17 parts |
| Magnesia dolomite clinker (less than 0.074 mm in size) | 39 parts |
| Total | 100 parts |

The above MD aggregate was mixed in a small mixer to obtain a homogeneous MD aggregate. The aggregate was analyzed to obtain the following results:

| | |
|---|---|
| MgO | 50.2% |

-continued

| | |
|---|---|
| CaO | 38.7% |

A binder shown in Table 13 was added in an amount shown in Table 13 in the MD aggregate in a wet pan mill and 55 parts of water was further added, and the mixture was stirred to obtain a homogeneous green composition of the MD aggregate. The composition was filled in a mold having an area of 230 mm × 114 mm and compression-molded under a pressure of 1000 $Kg/cm^2$ to obtain an angular column having a size of 230 mm × 114 mm × 65 mm and allowed to stand in a heating atmosphere maintained at 105° C. for 5 hours to obtain a test piece.

The physical properties indicated in Table 13 were determined, and the slaking resistance was determined according to the following method, to know whether or not the product could satisfactorily be used as an unfired refractory of dolomite bricks.

Slaking Resistance

The test piece brick was pulverized by a stamp mill and sieved to collect a fraction having a size of 3.36 mm to 2.00 mm as a sample. Then, 50 g of the sample was filled in a metal wire cage having a mesh size of 0.5 mm and maintained in a drying chamber at 105° C. for 2 hours. When the weight became unchangeable, the weight was measured. The weight of the cage was subtracted from the measured weight to determine a dry weight (W1) of the sample. An appropriate amount of water was charged in a vessel having a capacity larger than 1 l, and water was heated from the lower portion. After water was sufficiently boiled, the cage charged with the sample was sunk into the bottom of the vessel filled with boiling water. The sample was maintained in this state for 1 hour. Then, the sample was transferred to a sieve having a mesh size of 1 mm, washed with water and dried in a drying chamber maintained at 105° C. until the weight became unchangeable (W2). The powdering ratio was calculated according to the formula:

Powdering ratio (%) = [(W1 − W2)/W1] × 100

In comparative runs, the binder was not added but the aggregate alone was used (C-41), commercially available water glass (SS-1) was used as the binder (C-42), only the siliceous binder and the phosphate type hardening agent were added (C-43), a magnesia-dolomite brick was mixed with tar and pitch as the binder and the mixture was baked at 300° to 400° C. to obtain a refractory (C-41). Test pieces were similarly prepared and tested.

The obtained results are shown in Table 13.

From the results shown in Table 13, it is seen that in an unfired molded article by adding the binder of the present invention to the magnesia dolomite brick aggregate, the refractory characteristic is effectively utilized and powdering is not caused on contact with water and carbon dioxide gas. Thus, it will readily be understood that this unfired refractory product is excellent over tar-dolomite bricks heretofore used.

The above UR aggregate composition was filled in a wet pan mill, and 13 parts of water was added and a binder shown in Table 14 was incorporated. The mixture was stirred and blended. The resulting composition was analyzed to obtain the following results:

| | |
|---|---|
| $Al_2O_3$ | 44.5% |
| $SiO_2$ | 27.4% |
| SiC | 16.9% |
| C | 6.9% |

Then, the additives were added to the above composition to obtain a green composition comprising the UR aggregate. The green composition was filled in a mold having a length of 230 mm, a width of 150 mm and a height of 200 mm. The filled composition was compacted by a rammer, and the molded article was taken out from the mold and allowed to stand at normal temperatures for 24 hours to obtain a test piece.

Physical properties were determined to know

TABLE 13

| Run No. | C-41 (comparison) | C-42 (comparison) | C-43 (comparison) | C-44 (comparison) | 4-1 | 4-2 |
|---|---|---|---|---|---|---|
| Siliceous Binder | | | | | | |
| Sample No. | — | SS-1 | SSB-4 | — | SSB-4 | SSB-4 |
| Amount (parts) | 0 | 6 | 6 | 0 | 6 | 8 |
| Carbonizable Organic Binder | | | | | | |
| Kind | — | PRP | — | tar and pitch | PRP | PRP |
| Amount (parts) | 0 | 6 | 0 | 10 | 6 | 6 |
| Phosphate Type Hardening Agent | | | | | | |
| Sample No. | — | H-3 | H-3 | — | H-3 | H-3 |
| Amount (parts) | 0 | 3 | 3 | 0 | 3 | 4 |
| Bulk Density (g/cc) | 2.88 | 2.85 | 2.85 | 2.83 | 2.85 | 2.85 |
| Apparent Porosity (%) | 16.9 | 14.5 | 12.4 | 3.8 | 13.5 | 13.3 |
| Thermal Flexural Strength (Kg/cm$^2$) (at 1450° C.) | 72.8 | 46.1 | 63.3 | 21.1 | 89.7 | 88.3 |
| Compression Strength (Kg/cm$^2$) | 502 | 535 | 588 | 620 | 615 | 630 |
| Softening Point $T_2$ under Load (°C.) | 1700 | 1620 | 1650 | 1700 | 1680 | 1650 |
| Slaking Resistance (powdering ratio, %) | 35.7 | 33.1 | 0 | 0 | 0 | 0 |

EXAMPLE 5

An unfired refractory having a composition of a refractory of an indefinite shape (hereinafter referred to as "UR") is described in this Example.

The composition of this UR aggregate is as follows:

| | |
|---|---|
| Synthetic mulite (1-5 mm in size) | 60 parts |
| Synthetic mulite powder (less than 0.074 mm in size) | 20 parts |
| Silicon carbide (SiC, less than 0.074 mm in size) | 20 parts |
| Total | 100 parts |

The following additives were incorporated:

| | |
|---|---|
| Pitch powder | 4 parts |
| Scaly graphite | 4 parts |
| Lignin powder | 0.4 part |
| Gairome clay | 5 parts |
| Total | 13.4 parts | whether or not the product could satisfactorily be used as an unfired refractory of an indefinite shape.

In comparative runs, the binder was not added at all but the aggregate and additives were used (C-51), commercially available water glass (SS-1) was used as the binder (C-42) and the siliceous binder and phosphate type hardening agent alone were incorporated (C-53), and test pieces were similarly prepared and tested.

The obtained results are shown in Table 14.

From the results shown in Table 14, it will readily be understood that if the binder of the present invention is incorporated into an indefinite shape refractory composition, satisfactory effects are obtained in the resulting refractory of an indefinite shape. When the silicate customarily used as the binder for a refractory of this type is incorporated, the softening point under load was reduced. On the other hand, when the binder of the present invention is used, this undesirable reduction of the softening point under load is not caused. Thus, it will readily be understood that the composition of the present invention can effectively used as a liner for a tapping hole passage or the like.

TABLE 14

| Run No. | C-51 (comparison) | C-52 (comparison) | C-53 (comparison) | 5-1 | 5-2 | 5-3 |
|---|---|---|---|---|---|---|
| Siliceous Binder | | | | | | |
| Sample No. | — | SS-1 | SSB-4 | SSB-4 | SSB-4 | SSB-4 |
| Amount (parts) | 0 | 6 | 6 | 6 | 4 | 8 |
| Carbonizable Organic Binder | | | | | | |
| Kind | — | PRP | — | PRP | PRP | PRP |
| Amount (parts) | 0 | 6 | 0 | 6 | 6 | 6 |
| Phosphate Type Hardening Agent | | | | | | |
| Sample No. | — | H-3 | H-3 | H-3 | H-3 | H-3 |
| Amount (parts) | 0 | 3 | 3 | 3 | 2 | 4 |
| Bulk Density (g/cc) | 1.85 | 1.85 | 1.88 | 1.90 | 1.89 | 1.90 |
| Apparent Porosity (%) | 27.7 | 23.7 | 23.5 | 22.8 | 23.7 | 22.8 |
| Flexural Strength (Kg/cm$^2$) after Heating at 105° C. | 7.1 | 30.7 | 40.1 | 48.7 | 47.1 | 49.9 |
| Softening Point under Load ($T_2$ °C.) | 1580 | 1430 | 550 | 1580 | 1580 | 1580 |
| Thermal Linear Expansion or Contraction (%) (at 1000° C.) | 0.28 | 0.28 | 0.26 | 0.24 | 0.24 | 0.27 |

EXAMPLE 6

A tool brick used for calcination of ceramic articles such as pots or shelf plates is described in this Example.

Chamotte pulverized to a size less than 2 mm was mixed with siliceous sand powder having a size adjusted to less than 0.149 mm (capable of passing through a 100-mesh sieve) to obtain a starting material comprising 55% of chamotte and 45% of siliceous sand. The starting material was blended in a wet pan mill and a binder shown in Table 15 was added. In comparative run C-61, instead of 45% of siliceous sand, there were used 20% of Kubushi clay and 25% of siliceous sand.

The mixture was sufficiently stirred and blended in a mixer to obtain a green composition.

The chemical analysis results of the green composition were as follows:

| | |
|---|---|
| $Al_2O_3$ | 27.2% |
| $SiO_2$ | 71.7% |
| $Fe_2O_3$ | 1.2% |
| CaO | 0.2% |
| $R_2O$ | 0.3% |

The green composition was filled in a mold formed so as to obtain a molded article having an outer size of 300 mm × 300 mm × 65 mm and an inner size of 270 mm × 270 mm × 65 mm, and compression-molded under a pressure of at least 200 Kg/cm$^2$. The molded article was dried at 105° C. for 5 hours and naturally cooled to obtain a sample.

The physical properties indicated in Table 15 were determined to evaluate whether or not the obtained product could be used as a tool brick for calcination of ceramic articles. The obtained results are shown in Table 15.

Comparative compositions C-61 and C-62 were similarly molded and tested.

From the results shown in Table 15, it will readily be understood that a tool brick prepared by incorporating the binder of the present invention can satisfactorily used in the unfired state.

TABLE 15

| Run No. | C-61 (comparison) | C-62 (comparison) | 6-1 |
|---|---|---|---|
| Siliceous Binder | | | |
| Sample No. | — | SS-1 | SSB-4 |
| Amount (parts) | 0 | 6 | 6 |
| Carbonizable Organic Binder | | | |
| Kind | — | PRP | PRP |
| Amount (parts) | 0 | 6 | 6 |
| Phosphate Type Hardening Binder | | | |
| Sample No. | — | H-3 | H-3 |
| Amount (parts) | 0 | 3 | 3 |
| Bulk Density (g/cc) | 1.85 | 1.92 | 1.92 |
| Apparent Porosity (%) | 25.7 | 19.5 | 18.3 |
| Compression Strength (Kg/cm$^2$) | 210 | 230 | 370 |
| Thermal Linear Expansion or Contraction (%) (at 1000° C.) | 0.57 | 0.51 | 0.53 |
| Softening Point under Load ($T_2$, °C.) | 1310 | 1270 | 1300 |

What we claim is:

1. An unfired refractory composition comprising a refractory aggregate and a binder for the refractory aggregate, in which the binder comprises a water-soluble or water-dispersible siliceous binder in an amount of 1 to 20% by weight based on the refractory aggregate, a carbonizable organic binder in an amount of 2 to 15% by weight based on the refractory aggregate and a phosphate type hardening agent in an amount of 0.5 to 20% by weight based on the refractory aggregate wherein the siliceous binder is an alkali metal borosilicate binder in which the $M_2O/SiO_2$ molar ratio (in which M stands for an alkali metal) is in the range of from 0.4 to 1.20 and the $B_2O_3/SiO_2$ molar ratio is in the range of from 0.01 to 0.3

2. A composition as set forth in claim 1, wherein the carbonizable organic binder is a natural, semi-synthetic or synthetic paste.

3. A composition as set forth in claim 1, wherein the carbonizable organic binder is a thermosetting resin.

4. A composition as set forth in any one of claims 1, 2 or 3, wherein the phosphate type hardening agent has a composition represented by the following formula $$[MO_{m/2} \cdot nP_2O_5]M^1O_{m/2} \cdot nP_2O_5$$

wherein $M^1$ stands for a metal inclusive of silicon, m stands for the valency of the metal M, and n is a number of from 0.1 to 0.7 the initial dissolution amount (B), defined by the following formula, of the phosphate type hardening agent is smaller than 250:

$$Y = AX + B$$

wherein X stands for the elapsing time (minutes) of up to 120 minutes from the point when 1 gram of the hardening agent is added to a 4 N aqueous solution of sodium hydroxide, and Y stands for the integrated dissolution amount (mg/100 ml) of phosphoric acid dissolved out in the above sample solution during the elapsing time,
and the average hydrolysis speed constant (A) also defined by the formula is at least 0.2

5. A composition as set forth in claim 1 wherein the $M_2O/SiO_2$ molar ratio is in the range of from 0.5 to 1.1 and the $B_2O_3/SiO_2$ molar ratio is in the range of from 0.02 to 0.25.

6. A composition as set forth in claim 1 wherein the binder comprises 3 to 10 percent by weight based on the refractory aggregate of the siliceous binder, 4 to 8 percent by weight based on the refractory aggregate of the carbonizable organic binder and 1.5 to 10 percent by weight based on the refractory aggregate of the phosphate type hardening agent.

7. A composition as set forth in claim 1 wherein n is a number of from 0.2 to 0.5.

* * * * *

UNITED STATES PATENT AND TRADEMARK OFFICE
CERTIFICATE OF CORRECTION

PATENT NO. : 4,334,029
DATED : June 8, 1982
INVENTOR(S) : NAITO, ET AL.

It is certified that error appears in the above—identified patent and that said Letters Patent is hereby corrected as shown below:

Title page, item [73] should read as follows:

Mizusawa Kagaku Kogyo Kabushiki Kaisha, Mitsubishi Corporation and Yamato Refractories & Co.

Signed and Sealed this

Twenty-fourth Day of August 1982

|SEAL|

*Attest:*

GERALD J. MOSSINGHOFF

*Attesting Officer*    *Commissioner of Patents and Trademarks*